US010552331B2

(12) United States Patent
Kamikubo et al.

(10) Patent No.: US 10,552,331 B2
(45) Date of Patent: Feb. 4, 2020

(54) ARITHMETIC PROCESSING DEVICE HAVING A MOVE-IN BUFFER CONTROL UNIT THAT ISSUES A MOVE-IN REQUEST IN SHORTER TIME UPON A MEMORY ACCESS REQUEST, INFORMATION APPARATUS INCLUDING THE SAME AND METHOD FOR CONTROLLING THE ARITHMETIC PROCESSING DEVICE

(71) Applicant: FUJITSU LIMITED, Kawasaki-shi, Kanagawa (JP)

(72) Inventors: Yuki Kamikubo, Yokohama (JP); Noriko Takagi, Kawasaki (JP); Takahito Hirano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/683,838

(22) Filed: Aug. 23, 2017

(65) Prior Publication Data
US 2018/0095886 A1    Apr. 5, 2018

(30) Foreign Application Priority Data
Sep. 30, 2016  (JP) .................... 2016-193545

(51) Int. Cl.
*G06F 12/0877*  (2016.01)
*G06F 12/0891*  (2016.01)
*G06F 12/0897*  (2016.01)

(52) U.S. Cl.
CPC ...... *G06F 12/0877* (2013.01); *G06F 12/0891* (2013.01); *G06F 12/0897* (2013.01); *G06F 2212/1024* (2013.01)

(58) Field of Classification Search
None
See application file for complete search history.

(56) References Cited

U.S. PATENT DOCUMENTS 5,564,034 A * 10/1996 Miyake ............... G06F 12/0864
                                                      711/128
5,680,572 A * 10/1997 Akkary ............... G06F 12/0859
                                                      711/118

(Continued)

FOREIGN PATENT DOCUMENTS

JP    08-328960    12/1996
JP    09-218823    8/1997

(Continued)

*Primary Examiner* — Edward J Dudek, Jr.
*Assistant Examiner* — Ralph A Verderamo, III
(74) *Attorney, Agent, or Firm* — Fujitsu Patent Center

(57) ABSTRACT

An arithmetic processing device includes a memory access request issuance unit and a cache including a cache memory for tags and data and a move-in buffer control unit for issuing a move-in request for data on the memory access request when a cache miss occurs. The move-in buffer control unit, when the cache miss occurs, determines to acquire a move-in buffer and issue the move-in request when the memory access request has the same index as an index of any move-in request registered in the move-in buffer and the number of move-in requests of the same index registered in the move-in buffer is less than the number of ways, and determines not to acquire the move-in buffer and does not issue the move-in request when the memory access request has the same index and the number of the move-in requests of the same index reaches the number of the ways.

15 Claims, 16 Drawing Sheets

(56) References Cited

U.S. PATENT DOCUMENTS

| | | | |
|---|---|---|---|
| 6,282,617 B1* | 8/2001 | Tirumala | G06F 12/127 |
| | | | 711/133 |
| 6,401,175 B1* | 6/2002 | Tremblay | G06F 12/0804 |
| | | | 711/131 |
| 7,107,367 B1* | 9/2006 | Hughes | G06F 13/1673 |
| | | | 710/39 |
| 2006/0026361 A1 | 2/2006 | Shimizuno et al. | |
| 2006/0064547 A1* | 3/2006 | Kottapalli | G06F 12/123 |
| | | | 711/133 |
| 2006/0112234 A1* | 5/2006 | Cabot | G06F 9/30047 |
| | | | 711/138 |
| 2008/0301372 A1* | 12/2008 | Kojima | G06F 12/122 |
| | | | 711/128 |
| 2010/0088550 A1* | 4/2010 | Imai | G06F 12/0895 |
| | | | 714/42 |
| 2012/0198171 A1* | 8/2012 | Chachad | H03K 19/0016 |
| | | | 711/128 |
| 2014/0019690 A1* | 1/2014 | Hikichi | G06F 12/0862 |
| | | | 711/137 |
| 2017/0024329 A1* | 1/2017 | Ishii | G06F 12/0811 |
| 2018/0095886 A1 | 4/2018 | Kamikubo et al. | |

FOREIGN PATENT DOCUMENTS

| | | |
|---|---|---|
| JP | 2001-51899 A | 2/2001 |
| JP | 2006-039937 | 2/2006 |
| JP | 2018-55568 A | 4/2018 |
| WO | 2007/088591 A1 | 8/2007 |

* cited by examiner

FIG.7
MOVE-IN BUFFER MIB

| MOVE-IN BUFFER NO. | VALID | IDX_ADD | WAY | DATA | IDX_MCH_FLG |
|---|---|---|---|---|---|
| 0 | 1 | A | 0 | ---- | 0 |
| 1 | 1 | A | 1 | ---- | 1 |
| 2 | ---- | ---- | ---- | ---- | ---- |
| 3 | | | | | |
| 4 | | | | | |
| 5 | | | | | |
| 6 | | | | | |
| 7 | | | | | |
| 8 | | | | | |
| 9 | | | | | |

FIG.11

LRU TRUTH TABLE

[1]
| pattern | LRU INFORMATION | RPL-WAY |
|---|---|---|
| L-1 | LRU=WAY0 | W0 |
| L-2 | LRU=WAY1 | W1 |
| L-3 | LRU=WAY2 | W2 |
| L-4 | LRU=WAY3 | W3 |

[2]
| pattern | LRU INFORMATION | RPL-WAY |
|---|---|---|
| L-5 | LRU=WAY1 | W1 |
| L-6 | LRU=WAY2 | W2 |
| L-7 | LRU=WAY3 | W3 |

[3]
| pattern | LRU INFORMATION | RPL-WAY |
|---|---|---|
| L-8 | LRU=WAY0 | W0 |
| L-9 | LRU=WAY2 | W2 |
| L-10 | LRU=WAY3 | W3 |

[4]
| pattern | LRU INFORMATION | RPL-WAY |
|---|---|---|
| L-11 | LRU=WAY0 | W0 |
| L-12 | LRU=WAY1 | W1 |
| L-13 | LRU=WAY3 | W3 |

[5]
| pattern | LRU INFORMATION | RPL-WAY |
|---|---|---|
| L-14 | LRU=WAY0 | W0 |
| L-15 | LRU=WAY1 | W1 |
| L-16 | LRU=WAY2 | W2 |

[6]
| pattern | LRU INFORMATION | RPL-WAY |
|---|---|---|
| L-17 | LRU=WAY2 | W2 |
| L-18 | LRU=WAY3 | W3 |

[7]
| pattern | LRU INFORMATION | RPL-WAY |
|---|---|---|
| L-19 | LRU=WAY1 | W1 |
| L-20 | LRU=WAY3 | W3 |

[8]
| pattern | LRU INFORMATION | RPL-WAY |
|---|---|---|
| L-21 | LRU=WAY1 | W1 |
| L-22 | LRU=WAY2 | W2 |

[9]
| pattern | LRU INFORMATION | RPL-WAY |
|---|---|---|
| L-23 | LRU=WAY0 | W0 |
| L-24 | LRU=WAY3 | W3 |

[10]
| pattern | LRU INFORMATION | RPL-WAY |
|---|---|---|
| L-25 | LRU=WAY0 | W0 |
| L-26 | LRU=WAY2 | W2 |

[11]
| pattern | LRU INFORMATION | RPL-WAY |
|---|---|---|
| L-27 | LRU=WAY0 | W0 |
| L-28 | LRU=WAY1 | W1 |

※ RPL-WAY : REPLACE WAY
※ W0 : WAY NUMBER=0
※ W1 : WAY NUMBER=1
※ W2 : WAY NUMBER=2
※ W3 : WAY NUMBER=3

(CASE 1): INVALID WAY EXISTS IN L1 CACHE TAG

| pattern | invalid WAY * MIB NOT YET ACQUIRED | | | | RPL-WAY |
|---|---|---|---|---|---|
| | W0 | W1 | W2 | W3 | |
| 1-1 | 1 | - | - | - | W0 |
| 1-2 | 0 | 1 | - | - | W1 |
| 1-3 | 0 | 0 | 1 | - | W2 |
| 1-4 | 0 | 0 | 0 | 1 | W3 |

(CASE 2): OTHER THAN CASE 1 (NO INVALID WAY EXISTS)

| pattern | WAY ACQUIRING MOVE-IN BUFFER (1 = ACQUIRING) | | | | LRU TRUTH TABLE |
|---|---|---|---|---|---|
| | W0 | W1 | W2 | W3 | |
| 2-1 | 0 | 0 | 0 | 0 | [1] |
| 2-2 | 1 | 0 | 0 | 0 | [2] |
| 2-3 | 0 | 1 | 0 | 0 | [3] |
| 2-4 | 0 | 0 | 1 | 0 | [4] |
| 2-5 | 0 | 0 | 0 | 1 | [5] |
| 2-6 | 1 | 1 | 0 | 0 | [6] |
| 2-7 | 1 | 0 | 1 | 0 | [7] |
| 2-8 | 1 | 0 | 0 | 1 | [8] |
| 2-9 | 0 | 1 | 1 | 0 | [9] |
| 2-10 | 0 | 1 | 0 | 1 | [10] |
| 2-11 | 0 | 0 | 1 | 1 | [11] |
| 2-12 | 1 | 1 | 1 | 0 | W3 |
| 2-13 | 1 | 1 | 0 | 1 | W2 |
| 2-14 | 1 | 0 | 1 | 1 | W1 |
| 2-15 | 0 | 1 | 1 | 1 | W0 |

FIG. 13

※THE NUMBER OF WAYS OF CACHE = 4
※NO INVALID WAY EXISTS, ALL COMMAND 1 TO 9 HAVE SAME INDEX

| CYCLE | COMMAND | STAGE | OPERATION | W0 | W1 | W2 | W3 | MC |
|---|---|---|---|---|---|---|---|---|
| 3 | 1 | M | L1 CACHE MISS | 0 | 0 | 0 | 0 | 0 |
| 4 | 1 | S | MATCH COUNTER FULL DETERMINATION, ISSUANCE OF MOVE-IN BUFFER IS ALLOWED SINCE MATCH COUNTER IS NOT FULL | | | | | |
| 5 | 1 | B | REQUEST MOVE-IN BUFFER 0 (MIB 0) TO ACQUIRE MIB | | | | | |
| 6 | 1 | R | ACQUIRE MIB 0 | | | | | |
| 7 | 1 | R1 | FIX REPLACE WAY, (CASE 2) RPL-WAY = WAY0 SINCE LRU = WAY0 IN TRUTH TABLE OF PATTERN 2-1 IN WHICH NO WAY ACQUIRING MIB EXISTS | | | | | |
| 7 | 5 | M | L1 CACHE MISS | 1 | 0 | 0 | 0 | 1 |
| 8 | 1 | R2 | REGISTER REPLACE WAY = 0 IN MIB 0 | | | | | |
| 8 | 5 | S | MATCH COUNTER FULL DETERMINATION, ISSUANCE OF MOVE-IN BUFFER IS ALLOWED SINCE MATCH COUNTER IS NOT FULL | | | | | |
| 9 | 5 | B | REQUEST MIB 1 TO ACQUIRE MIB | | | | | |
| 10 | 5 | R | ACQUIRE MIB 1 | | | | | |
| 11 | 5 | R1 | FIX REPLACE WAY, (CASE 2) RPL-WAY = WAY1 SINCE LRU = WAY 1 IN TRUTH TABLE OF PATTERN 2-2 IN WHICH WAY 0 HAS ACQUIRED MIB | | | | | |
| 11 | 6 | M | L1 CACHE MISS | 1 | 1 | 0 | 0 | 2 |
| 12 | 5 | R2 | REGISTER REPLACE WAY = 1 IN MIB 1 | | | | | |
| 12 | 6 | S | MATCH COUNTER FULL DETERMINATION, ISSUANCE OF MOVE-IN BUFFER IS ALLOWED SINCE MATCH COUNTER IS NOT FULL | | | | | |
| 13 | 6 | B | REQUEST MIB 2 TO ACQUIRE MIB | | | | | |
| 14 | 6 | R | ACQUIRE MIB 2 | | | | | |
| 15 | 6 | R1 | FIX REPLACE WAY, (CASE 2) RPL-WAY = WAY2 SINCE LRU = WAY 2 IN TRUTH TABLE OF PATTERN 2-6 IN WHICH WAYS 0 AND 1 HAVE ACQUIRED MIB | | | | | |
| 15 | 7 | M | L1 CACHE MISS | 1 | 1 | 1 | 0 | 3 |
| 16 | 6 | R2 | REGISTER REPLACE WAY = 2 IN MIB 2 | | | | | |
| 16 | 7 | S | MATCH COUNTER FULL DETERMINATION, ISSUANCE OF MOVE-IN BUFFER IS ALLOWED SINCE MATCH COUNTER IS NOT FULL | | | | | |
| 17 | 7 | B | REQUEST MIB 3 TO ACQUIRE MIB | | | | | |
| 18 | 7 | R | ACQUIRE MIB 3 | | | | | |
| 19 | 7 | R1 | FIX REPLACE WAY, (CASE 2) RPL-WAY=WAY3 SINCE LRU=WAY3 IN TRUTH TABLE OF PATTERN 2-12 IN WHICH WAYS 0, 1, AND 2 HAVE ACQUIRED MIB | | | | | |
| 19 | 8 | M | L1 CACHE MISS | | | | | |
| 20 | 7 | R2 | REGISTER REPLACE WAY = 3 IN MIB 3 | | | | | |
| 20 | 8 | S | MATCH COUNTER FULL DETERMINATION, ISSUANCE OF MOVE-IN BUFFER IS NOT ALLOWED SINCE MATCH COUNTER IS FULL | | | | | |
| 21 | 8 | B | | | | | | |
| 22 | 8 | R | | | | | | |
| 23 | 8 | R1 | CAUSE COMMAND 8 TO STAY | | | | | |
| 24 | 9 | P | | | | | | |
| 25 | 9 | T | | | | | | |
| 26 | 9 | M | L1 CACHE MISS | 0 | 1 | 1 | 1 | 2 |
| 27 | 9 | S | MATCH COUNTER FULL DETERMINATION, ISSUANCE OF MOVE-IN BUFFER IS ALLOWED SINCE MATCH COUNTER IS NOT FULL | | | | | |
| 28 | 9 | B | REQUEST MIB0 TO ACQUIRE MIB | | | | | |
| 29 | 9 | R | ACQUIRE MIB 0 | | | | | |
| 30 | 9 | R1 | FIX REPLACE WAY, (CASE 2) RPL-WAY=WAY0 SINCE LRU=WAY0 IN TRUTH TABLE OF PATTERN 2-15 IN WHICH WAYS 1, 2, AND 3 HAVE ACQUIRED MIB | 1 | 1 | 1 | 1 | 3 |
| 31 | 9 | R2 | REGISTER REPLACE WAY = 0 IN MIB0 | | | | | |

FIG.14

WHERE ONE MATCH COUNTER IS USED (SHARED)

| COMMAND | INDX_ADD ADD_2 | MCH_CNT (SHARED) | MOVE-IN REQUEST | IDX_ADD THAT HAS ACQUIRED MIB | REASON |
|---|---|---|---|---|---|
| COMMAND 1 | A | 0 | ISSUANCE | A | |
| COMMAND 2 | A | 1 | ISSUANCE | AA | A HAS BEEN REGISTERED IN MIB |
| COMMAND 3 | B | 1 | ISSUANCE | AAB | |
| COMMAND 4 | C | 1 | ISSUANCE | AABC | |
| COMMAND 5 | B | 2 | ISSUANCE | AABBC | B HAS BEEN REGISTERED IN MIB |
| COMMAND 6 | A | 3 | ISSUANCE | AAABBC | A HAS BEEN REGISTERED IN MIB |
| COMMAND 7 | C | 3 | STAY | AAABBC | COUNTER=3 |
| COMMAND 8 | A | 3 | STAY | AAABBC | COUNTER=3 |
| COMMAND 9 | A | 3 | STAY | AAABBC | COUNTER=3 |

FIG.15

WHERE TWO MATCH COUNTERS ARE USED (EXCLUSIVELY USED)

| COMMAND | INDX_ADD ADD_2 | MCH_CNT (EXCLUSIVE USE) | MOVE-IN REQUEST | IDX_ADD THAT HAS ACQUIRED MIB | REASON |
|---|---|---|---|---|---|
| COMMAND 1 | A | 0 | ISSUANCE | A | A HAS BEEN REGISTERED IN MIB |
| COMMAND 2 | A | 1 (EXCLUSIVELY USED BY A) | ISSUANCE | AA | |
| COMMAND 3 | B | 1 | ISSUANCE | AAB | |
| COMMAND 4 | C | 1 | ISSUANCE | AABC | |
| COMMAND 5 | B | 1 | STAY | AABC | NO COUNTER FOR B |
| COMMAND 6 | A | 2 | ISSUANCE | AAABC | |
| COMMAND 7 | C | 2 | STAY | AAABC | NO COUNTER FOR C |
| COMMAND 8 | A | 3 | ISSUANCE | AAAABC | |
| COMMAND 9 | A | 3 | STAY | AAAAABC | MAXIMUM COUNT VALUE |
| ... | ... | ... | ... | A×3, B×2 DATA RESPONSE | MCH_CNT OPEN |
| COMMAND 10 | B | 0 | ISSUANCE | B | B HAS BEEN REGISTERED IN MIB |
| COMMAND 11 | B | 1 (EXCLUSIVELY USED BY B) | ISSUANCE | BB | |
| COMMAND 12 | B | 2 | ISSUANCE | BBB | |

FIG.16

WHERE TWO MATCH COUNTERS ARE USED (BOTH EXCLUSIVELY USED)

| COMMAND | INDX_ADD ADD_2 | MCH_CNT_0 (EXCLUSIVE USE) | MCH_CNT_1 (EXCLUSIVE USE) | MOVE-IN REQUEST | IDX_ADD THAT HAS ACQUIRED MIB | REASON |
|---|---|---|---|---|---|---|
| COMMAND 1 | A | 0 | 0 | ISSUANCE | A | |
| COMMAND 2 | A | 1 (EXCLUSIVELY USED BY A) | 0 | ISSUANCE | AA | A HAS BEEN REGISTERED IN MIB |
| COMMAND 3 | B | 1 | 0 | ISSUANCE | AAB | |
| COMMAND 4 | C | 1 | 0 | ISSUANCE | AABC | |
| COMMAND 5 | B | 1 | 1 (EXCLUSIVELY USED BY B) | ISSUANCE | AABBC | B HAS BEEN REGISTERED IN MIB |
| COMMAND 6 | A | 2 | 1 | ISSUANCE | AAABBC | |
| COMMAND 7 | C | 2 | 1 | STAY | AAABBC | NO COUNTER FOR C |
| COMMAND 8 | A | 3 | 1 | ISSUANCE | AAAABBC | |
| COMMAND 9 | A | 3 | 1 | STAY | AAAABBC | MAXIMUM COUNT VALUE |

ARITHMETIC PROCESSING DEVICE HAVING A MOVE-IN BUFFER CONTROL UNIT THAT ISSUES A MOVE-IN REQUEST IN SHORTER TIME UPON A MEMORY ACCESS REQUEST, INFORMATION APPARATUS INCLUDING THE SAME AND METHOD FOR CONTROLLING THE ARITHMETIC PROCESSING DEVICE

CROSS-REFERENCE TO RELATED APPLICATION

This application is based upon and claims the benefit of priority of the prior Japanese Patent Application No. 2016-193545, filed on Sep. 30, 2016, the entire contents of which are incorporated herein by reference.

FIELD

The present invention relates to a arithmetic processing device, an information processing apparatus, and a method for controlling a arithmetic processing device.

BACKGROUND

A arithmetic processing device (processor, central processing unit (CPU)) has a cache memory to avoid a long latency for accessing a main storage unit (main memory) provided outside. The cache memory stores data read out from the main memory when the processor executes a memory access command (or instruction). Then, when executing the memory access command again about the same address, the processor reads out the data from the cache memory to avoid accessing the main memory.

When the command issuance unit of the processor issues the memory access command (or request), the memory access request is input to a cache. Then, the cache executes a cache determination as to whether data on an access address has been retained by the cache memory. When it is determined that a cache hit occurs, the cache returns the data in the cache memory (returns a response with data) to the command issuance unit. On the other hand, when it is determined that a cache miss occurs, the cache issues a move-in request to a low-level cache closer to the main memory or a memory control circuit.

The move-in request is a request for which a certain-level cache requests a low-level cache closer to the main memory or the memory control unit to give data on an access address, therefore, the move-in buffer is a type of a memory access request. The move-in request is issued by a cache in which a cache miss has occurred.

The move-in request is described in Japanese Laid-open Patent Publication Nos. H08-328960 and H09-218823.

Since it may take a long time from the issuance of a move-in request to a data response, a move-in buffer capable of having registered therein information indicating that the move-in request has been issued is provided, for example, between an L1 cache and an L2 cache (or between the L2 cache and an L3 cache). When issuing the move-in request, the L1 cache acquires the move-in buffer and registers, in the move-in buffer, information on the move-in request, i.e., index information (index address) on a cache memory in which a cache miss has occurred and way information on the cache in which response data is to be registered after a data response.

After the L2 cache issues an ejection request to eject old data that has been registered in the L1 cache to the L1 cache and the data is ejected from the L1 cache to the L2 cache, the L1 cache receives data from the L2 cache and stores the new data in the data region of the corresponding move-in buffer. Then, the L1 cache registers the new data in an L1 cache memory based on the index information and the way information that have been registered in the move-in buffer, and returns the data to the command issuance unit (or an upper level cache more distant from the main memory). After giving the data, the move-in buffer that has acquired the information on the move-in request is opened. By registering information of a plurality of move-in requests registered in the move-in buffer, the L1 cache issues a next move-in request before receiving a data response for a preceding move-in request.

SUMMARY

Here, it may be necessary for the cache to suppress a plurality of move-in requests of the same index and the same way from being issued at the same time frame. This is because, for example, a request to eject data inside a replace way for the following move-in request is likely to get ahead of a data response for a preceding move-in request. In this case, the response data of the preceding move-in request is registered in the cache after the data on the following move-in request is ejected with respect to the same cache block (cache block at the same index and the same way). In such an operation, cache coherency is not maintained between the L1 cache and the L2 cache, and a protocol error occurs in the caches.

Meanwhile, at the occurrence of a cache miss, the cache determines whether the index of the cache memory of a memory access request in which the cache miss has occurred is the same as that of an operating move-in request that has been registered in the move-in buffer. When it is determined that the indexes are different from each other, the memory access request acquires a new move-in buffer and issues a move-in request. Conversely, when it is determined that the indexes are the same, the acquisition of the move-in buffer is suppressed, the issuance of the move-in request is suppressed, and the memory access request is aborted and returned to the request ports.

According to the above control to suppress the acquisition of a move-in buffer and the issuance of a move-in request, when a memory access request in which a cache miss has occurred has the same index as that of the move-in request that has been registered in the move-in buffer, even if the memory access request has a way different from the way of the move-in request registered in the move-in buffer, the acquisition of the move-in buffer and the issuance of the move-in request are suppressed or are not executed. Therefore, the issuance of the following move-in request of the same index is suppressed until a data response for the preceding move-in request of the same index is received, and the issuance of a plurality of move-in requests for the same index but different ways in parallel is not allowed. As a result, the latency of the low-level cache or a memory control circuit of a destination to which a move-in request is to be issued cannot be concealed, which causes a reduction in the performance of a processor.

An arithmetic processing device comprising: a memory access request issuance unit configured to issue a memory access request; and a cache including a cache memory that has a tag memory and a data memory and a move-in buffer control unit that is configured to issue a move-in request for data on the memory access request when a cache miss occurs in the memory access request, wherein the move-in buffer control unit, when the cache miss occurs to the memory access request, determines to acquire a move-in buffer and issues the move-in request when the memory access request has the same index as an index of any move-in request that has been registered in the move-in buffer and the number of move-in requests of the same index that has been registered in the move-in buffer is less than the number of ways of the cache memory, and determines not to acquire the move-in buffer and does not issue the move-in request when the memory access request has the same index as the index of the move-in request that has been registered in the move-in buffer and the number of the move-in requests of the same index that has been registered in the move-in buffer reaches the number of the ways.

According to a first aspect, a cache improves the ability to issue a move-in request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of the move-in buffer MIB.

FIG. 11 is a diagram illustrating the truth tables of the replace way selection circuit.

FIG. 13 is a diagram illustrating the stage and the operation of each command for each cycle of FIG. 12.

FIG. 14 is a diagram illustrating an operating example in a case in which one match counter is shared by different index addresses in the first match counter example.

FIG. 15 is a diagram illustrating an operating example in a case in which one match counter is exclusively used by a specific index address in the second match counter example.

FIG. 16 is a diagram illustrating an operating example in a case in which two match counters are exclusively used by the two types of the same index addresses that are first generated in the third match counter example.

DESCRIPTION OF EMBODIMENTS

Figure 1:
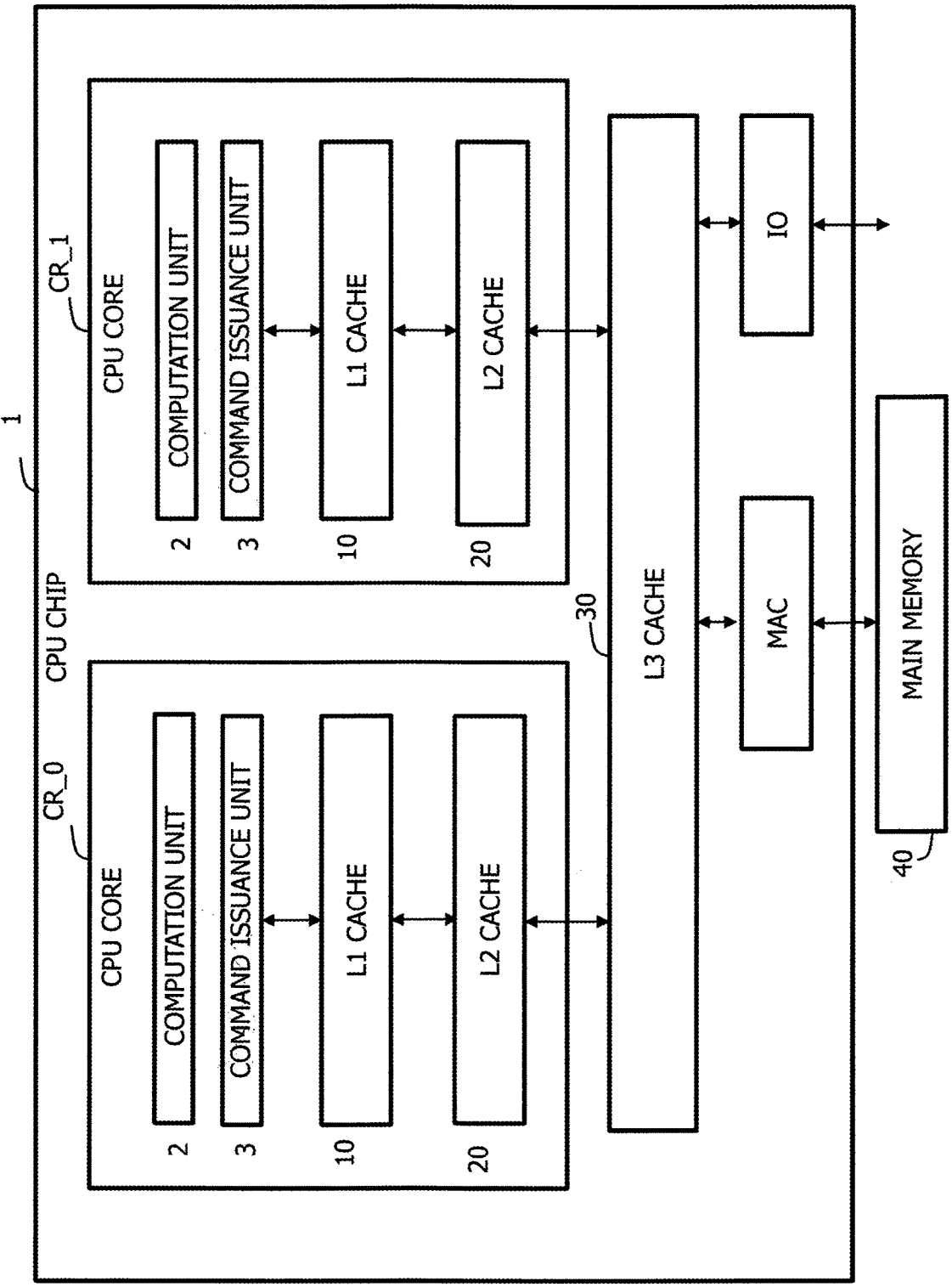
FIG. 1 is a diagram illustrating the configuration of a computation processing unit (processor) according to an embodiment.

FIG. 1 is a diagram illustrating the configuration of a arithmetic processing device (processor) according to an embodiment. A processor 1 is, for example, a CPU chip and capable of accessing a main storage unit (main memory) 40 such as a DRAM. The processor 1 and the main memory 40 constitute an information processing apparatus such as a computer.

The processor 1 has, for example, a plurality of CPU cores CR_0 and CR_1. The respective CPU cores have, for example, an arithmetic logic unit 2, a command issuance unit 3, a first-level cache (L1 cache) 10, and a second-level cache (L2 cache) 20. In addition, the processor 1 has a third-level cache (L3 cache) 30 shared by the L2 caches 20 of the plurality of CPU cores, a memory access controller MAC that controls access to the main memory 40, and an input/output circuit IO that performs an input/output operation on a hard disk or the like provided outside the CPU chip.

A cache having a move-in buffer according to the embodiment may corresponds to, for example, any of the L1 cache 10, the L2 cache 20, and the L3 cache 30. However, the following embodiment will describe an example in which a cache having a move-in buffer corresponds to the L1 cache 10.

When the command issuance unit 3 issues a memory access request such as a load command and a store command in any of the CPU cores, the memory access request is input to the L1 cache 10. The following embodiment will describe an example in which the memory access request is a load command. The L1 cache 10 searches a tag memory based on the access address of a memory access request to determine the cache hit or not. When a cache hit occurs in the L1 cache 10, the L1 cache 10 returns data in the L1 cache 10 to the command issuance unit 3. On the other hand, when a cache miss occurs in the L1 cache 10, the L1 cache 10 issues a move-in request to the L2 cache 20. The move-in request is a request to register data on the memory access request in the L1 cache memory. Then, when receiving a data response from the L2 cache, the L1 cache 10 returns the data to the command issuance unit 3.

When a cache miss occurs in the L2 cache 20 about the move-in request (a kind of memory access request) issued by the L1 cache 10, the L2 cache 20 issues a move-in request to the L3 cache 30 in the same manner as the above. Similarly, when a cache miss occurs in the L3 cache about the move-in request from the L2 cache, the L3 cache issues an access request equivalent to the move-in request to the memory access controller MAC. That is, when a cache miss occurs in a certain-level cache about a received memory access request, the cache issues a move-in request to a cache at a level closer to the main memory or the memory controller.

Each of the caches has a move-in buffer (not illustrated) that registers information on a move-in request between the cache itself and a cache on the side of the main memory or between the cache itself and the memory access controller. With a plurality of move-in buffers being provided in the cache, the caches are allowed to have registered therein information on a plurality of move-in requests and therefore be able to issue the plurality of move-in requests in a short period of time.

Figure 2:
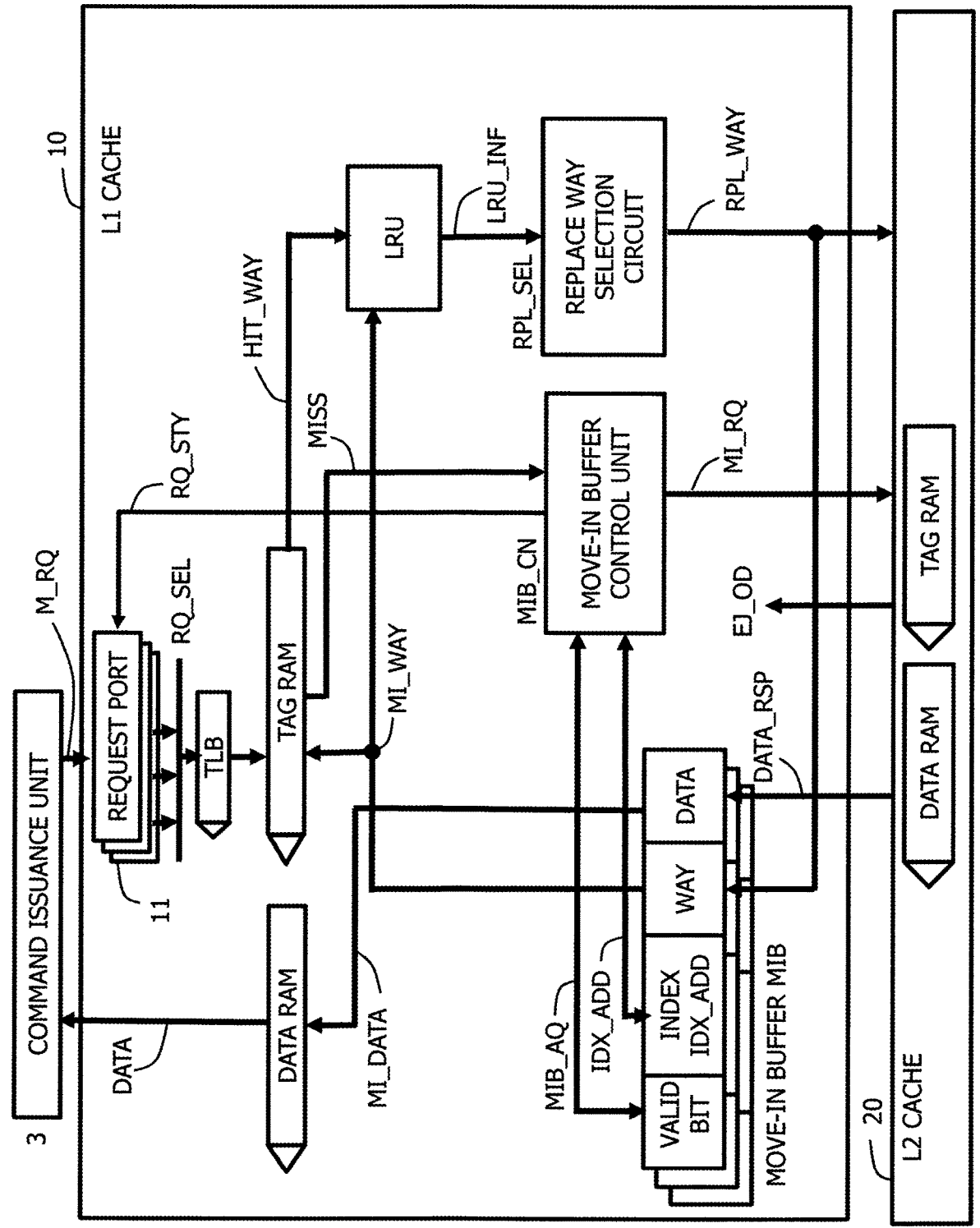
FIG. 2 is a diagram illustrating the configurations of the L1 cache and the L2 cache.

FIG. 2 is a diagram illustrating the configurations of the L1 cache and the L2 cache. The configurations of the L2 cache and the L3 cache are also the same. The configurations of the L3 cache and the memory access controller MAC are also the same except that a cache memory is not provided in the memory access controller MAC.

The L1 cache 10 has a plurality of request ports 11 that stores a memory access request M_RQ from the command issuance unit 3, a stay memory access request RQ_STY that is returned and stays in the L1 cache, or the like, and a request selection circuit RQ_SEL that selects a request inside the plurality of request ports based on prescribed priority. The request selection circuit RQ_SEL inputs a selected memory access request to a cache pipeline inside the L1 cache 10.

The cache pipeline is constituted by a translation lookaside buffer (TLB), a data memory DATA_RAM and a tag memory TAG_RAM constituting a cache memory, a move-in buffer control unit MIB_CN, a replace way selection circuit RPL_SEL, or the like. The TLB converts the logical address of a memory access request M_RQ into a physical address. The tag memory TAG_RAM has registered therein validity and address information on data registered in the cache, and is referred to determine the cache hit of a memory access request. Then, the tag memory outputs way information HIT_WAY to an LRU when a cache hit occurs, and outputs a cache miss MISS to the move-in buffer control unit MIB_CN when a cache miss occurs.

The move-in buffer control unit MIB_CN acquires a move-in buffer MIB for a memory access request in which a cache miss has occurred from the tag memory, and issues a move-in request MI_RQ to the L2 cache 20 if acquired. The replace way selection circuit RPL_SEL selects, based on LRU information LRU_INF from the LRU, a replace way RPL_WAY indicating to which way of the cache memory the response data for the move-in request is registered.

Besides, the L1 cache 10 has an LRU circuit LRU and a move-in buffer MIB. The LRU circuit determines how old access to each way of the cache memory (DATA_RAM and TAG_RAM) is, based on way information HIT_WAY where a cache hit occurs and way information MI_WAY of a move-in request stored in the move-in buffer MIB, and outputs LRU information LRU_INF. The move-in buffer MIB is acquired when a move-in request is issued, registers therein information on an operating move-in request (valid bit, index address IDX_ADD, replace way, and data), and is opened when a data response for a move-in request is received and the data is registered in the cache.

Figure 3:
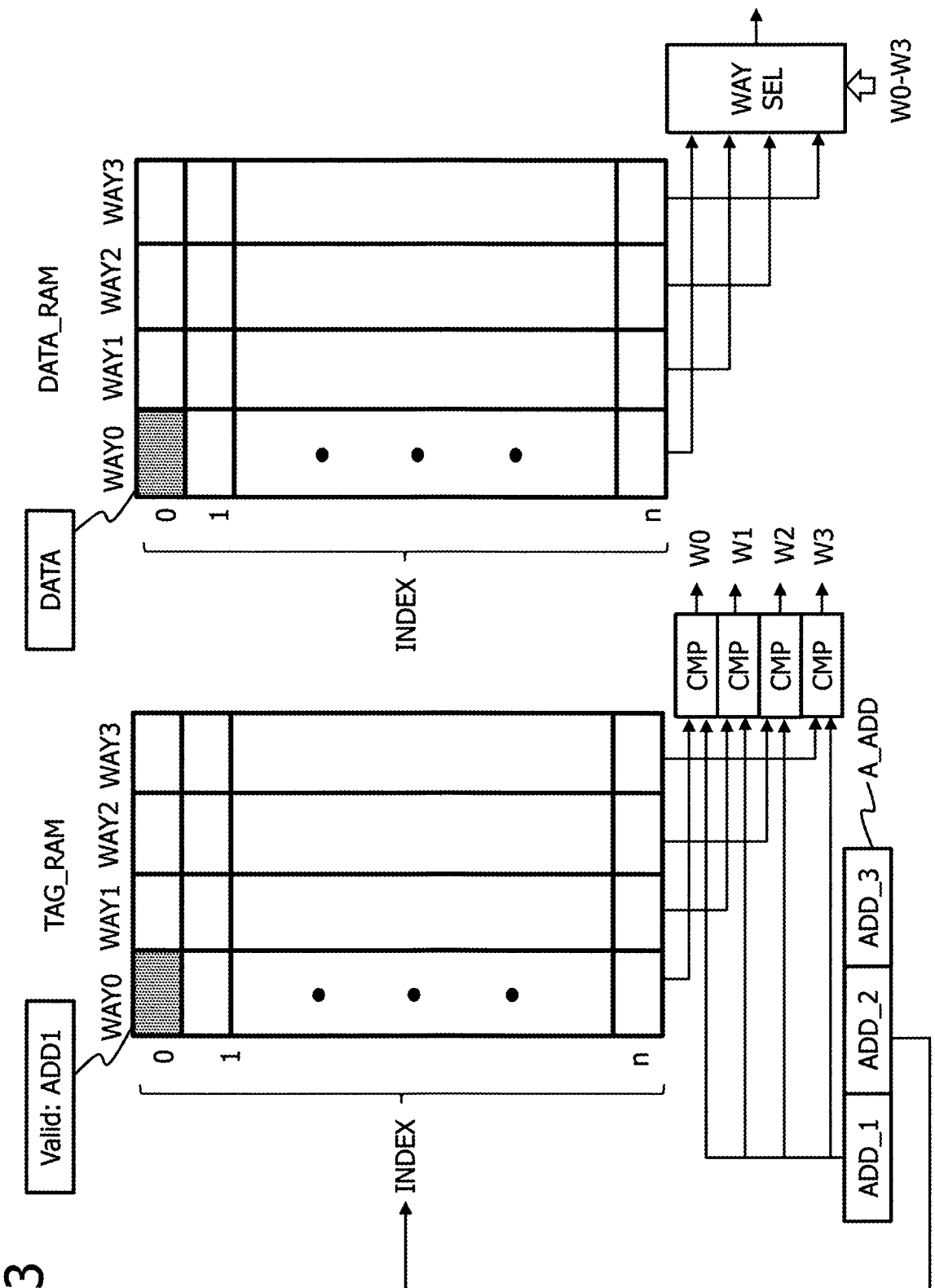
FIG. 3 is a diagram illustrating a configuration example of a cache memory.

FIG. 3 is a diagram illustrating a configuration example of a cache memory. The cache memory of FIG. 3 is an example of a 4-way set associative cache memory. A tag memory TAG_RAM and a data memory DATA_RAM constituting the cache memory have cache lines each corresponding to indexes 0 to n respectively. Then, an address ADD_2 constituting a lower part ADD_2 and ADD_3 of the access address A_ADD of a memory access request is input as an index address to a decoder (not illustrated), and one index corresponding to the index address is selected. In addition, the upper address ADD_1 of the access address A_ADD (upper address of a physical address obtained by converting a logical address at a TLB) is stored in the tag memory TAG_RAM. That is, a valid bit Valid and the upper address ADD_1 are stored in the tag memory TAG_RAM.

Then, four comparators CMP compare each of the addresses ADD_1 stored in the four ways at the indexes in the tag memory selected by the index address ADD_2 with the upper address ADD_1 of the access address A_ADD (upper address of the physical address obtained by converting the logical address at the TLB). When the addresses ADD_1 and the upper address ADD_1 match each other, the comparators CMP set one of the hit way information W0 to W3 at "1" (indicating a cache hit). When a cache hit occurs, one comparator sets the hit way information W0 to W3 at "1." When a cache miss occurs, all the four comparators CMP set the hit way information W0 to W3 at "0."

In addition, a way selector WAY_SEL selects, based on the hit way information W0 to W3, matched way data from among data DATA in the four ways in the data memory DATA_RAM that are selected by the index address ADD_2.

Thus, the set associative cache memory collectively stores data in each of the cache blocks, which are provided at each of the indexes selected by the index address ADD_2. In addition, the cache memory registers therein data DATA in the way number of (way number=four in FIG. 3) memory blocks at maximum with respect to the same index address ADD_2. Note that although not illustrated in FIG. 3, the lower address ADD_3 of the access address A_ADD is used to select access destination data from a selected cache block.

As described above, the index of the cache memory is selected by the index address ADD_2, and the same index is selected when the index address is the same. In the following description, for the sake of convenience, the index address ADD_2 of a memory access request may be called an index, and the index address IDX_ADD of a move-in request that has been requested and stored in a move-in buffer may also be called an index.

Figure 4:
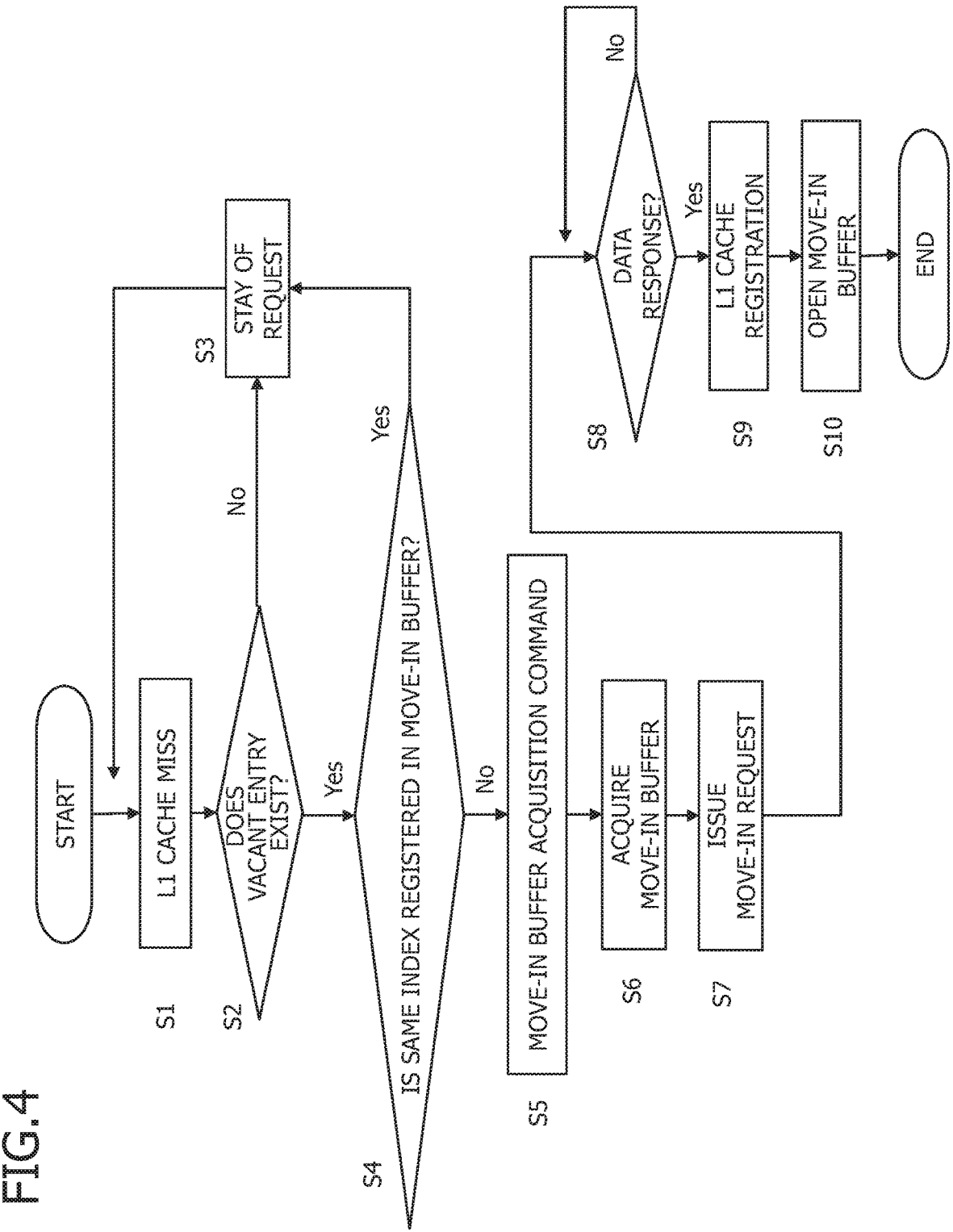
FIG. 4 is a diagram illustrating the operation of the move-in buffer control unit MIB_CN of the L1 cache of FIG. 2.

FIG. 4 is a diagram illustrating the operation of the move-in buffer control unit MIB_CN of the L1 cache of FIG. 2. First, when a memory access request issued from the command issuance unit is input to the cache pipeline by the request selection circuit RQ_SEL, the logical address of the memory access request is converted into a physical address by the TLB and the tag memory TAG_RAM determines the occurrence of a cache hit as described in FIG. 3. Then, when a cache miss occurs, the move-in buffer control unit MIB_CN receives an L1 cache miss MISS (S1). The L1 cache miss MISS corresponds to the memory access request in which the cache miss has occurred, and has an access address.

The move-in buffer control unit determines whether any vacant entry exists in the move-in buffer MIB (S2). This determination is made in such a manner as to check the valid bits of all the entries of the move-in buffer MIB. For example, it may be determined that no vacant entry exist when the output of an AND gate with all the valid bits as inputs is "1" and that any vacant entry exists when the output thereof is "0." When no vacant entry exists, the acquisition of the move-in buffer is not allowed. Therefore, the issuance of a move-in request is not allowed for the memory access request in which the cache miss has occurred. Then, the move-in buffer control unit returns the memory access request in which the cache miss has occurred to the request ports 11 (stay request RQ_STY in FIG. 2) (S3), and the memory access request is suppressed from being input to the cache pipeline until a next time.

In addition, the move-in buffer control unit determines whether an index address IDX_ADD that is same as the index address ADD_2 of the memory access request has been registered in the move-in buffer (S4). This determination may be made by, for example, an index match determination circuit that determines the matching between each of all the index addresses IDX_ADD (in the move-in buffer MIB) and the index address ADD_2 of the memory access request. In the L1 cache of FIG. 2, the move-in buffer control unit does not acquire the move-in buffer when the move-in request of the same index (i.e., the same index address) has been registered in the move-in buffer MIB, and returns the memory access request to the request ports 11 (S3).

On the other hand, when any vacant entry exists in the move-in buffer (YES in S2) and the move-in request of the same index has not been registered in the move-in buffer (NO in S4), the move-in buffer control unit issues a move-in buffer acquisition request MIB_AQ (S5). Thus, the move-in buffer control unit sets the valid bit of the vacant entry of the move-in buffer at a valid state, i.e., "1" to acquire the move-in buffer (S6). When acquiring the move-in buffer, the move-in buffer control unit registers the index address ADD_2 of the memory access request in the region of the index address IDX_ADD of the move-in buffer.

After that, although not illustrated in FIG. 4, the replace way selection circuit RPL_SEL selects a replace way, as a destination in which response data for the move-in request is to be registered in the cache, based on LRU information LRU_INF indicating the earliest-accessed way among the four ways in the index IDX of the memory access request in the cache memory. Normally, the replace way selection circuit RPL_SEL selects the earliest-accessed way. This is because data in the replace way is replaced with the response data of the move-in request.

The move-in buffer control unit of FIGS. 2 and 4 acquires the move-in buffer and issues the move-in request when the same index as that of the memory access request in which the cache miss has occurred has not been registered in the move-in buffer. Accordingly, the replace way selection circuit is allowed to select any way at the index of the memory access request in the cache memory as a replace way. Thus, the replace way is selected based on LRU information as described above.

Then, the L1 cache 10 receives a data response from the L2 cache 20 (YES in S8). Data received from the L2 cache 20 is stored in the data region of the corresponding entry of the move-in buffer MIB, and registered in a block to be replaced in the L1 cache memory based on the index address registered in the move-in buffer and the replace way (S9). After the registration of the data in the L1 cache memory, the move-in buffer control unit invalidates the valid bit of the entry of the move-in buffer to open the entry (S10).

Note that although not illustrated in FIG. 4, the L2 cache issues, to the L1 cache an order for ejecting data in the replace way of the index to the L2 cache memory before the data response by L2 cache, when valid data has been registered in the replace way of the cache memory. After the ejection of the data is completed, the response data from the L2 cache is registered in the replace way of the L1 cache.

Here, the cache may be required to suppress a plurality of move-in requests, in which the cache block of the same index and the same way in the cache memory is treated as a replace block, from being issued and processed at the same time frame. This is because, for example, a request to eject data in a replace way for the following move-in request is likely to get ahead of a data response for a preceding move-in request. For example, the case where ithe preceding move-in request needs to access to a main memory but the following move-in request needs not. In this case, the response data of the preceding move-in request is registered in the cache after the data of the following move-in request is ejected with respect to the same cache block (block of the same index and the same way). In such an operation, cache coherency is not maintained between the L1 cache and the L2 cache, and a protocol error occurs in the caches. In addition, it may be necessary to prevent the response data of the preceding move-in request from being registered in the cache after the response data of the following move-in request is registered in the cache.

Meanwhile, the L1 cache of FIGS. 2 and 4 determines whether the index of the cache memory of the memory access request in which the cache miss has occurred is the same as that of the move-in request or requests that has or have been registered in the move-in buffer. When it is determined that the indexes are different from each other (specifically, the index addresses are different from each other), the memory access request acquires the move-in buffer to issue the move-in request. Conversely, when it is determined that the indexes are the same, the acquisition of the move-in buffer is suppressed, the issuance of the move-in request is suppressed, and the memory access request is aborted and returned to the request ports 11.

According to the above move-in buffer control unit, when a memory access request in which a cache miss has occurred has the same index as that of the move-in request that has been registered in the move-in buffer, even if a way for the memory request is different from the way of the move-in request that has been registered, the acquisition of a move-in buffer and the issuance of a move-in request are suppressed or are not executed. Therefore, until a data response for the preceding move-in request of the same index is received, the issuance of the following move-in request of the same index is suppressed and the issuance of a plurality of move-in requests for the same index but different ways in parallel is not allowed. As a result, the latency of the low-level cache or the memory control circuit of a destination to which a move-in request is to be issued cannot be concealed, which causes a reduction in the performance of a processor.

Figure 5:
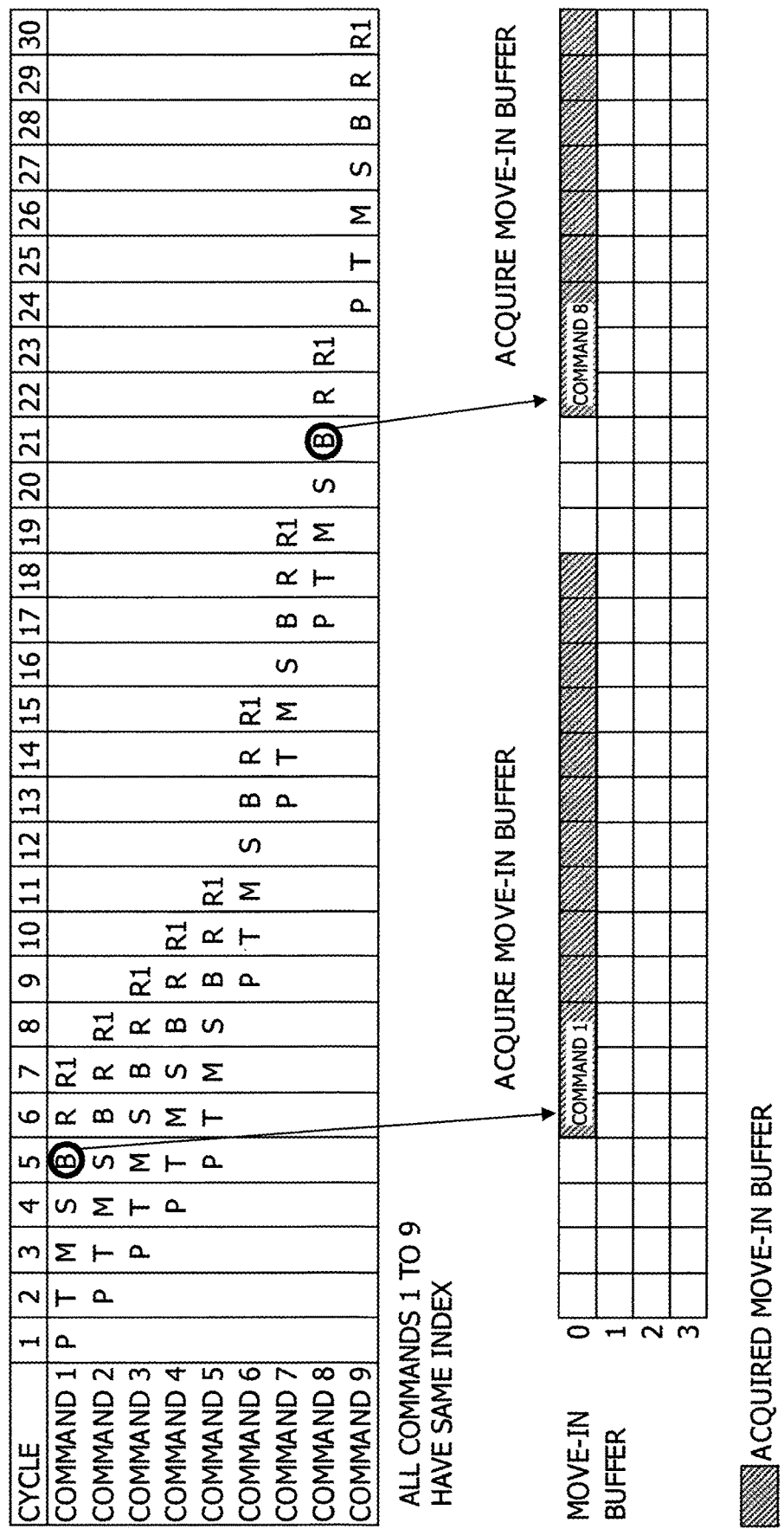
FIG. 5 is a timing chart diagram illustrating the control of the move-in buffer control unit.

FIG. 5 is a timing chart diagram illustrating the control of the move-in buffer control unit. It is assumed that all commands 1 to 9 are memory access requests for the same index (same index address). Further, the respective commands accompany the occurrence of a cache miss (M) and the issuance of a move-in request (R) via the P, T, M, S, B, R, and R1 stages of the pipeline of the L1 cache.

As described above, after a cache miss occurs at the command 1 and the zero-th move-in buffer is acquired, the following commands 2 to 7 are requests for the same index (index address) as that the a move-in request that has been registered. Therefore, the acquisition of the move-in buffer for the following commands 2 to 7 is suppressed, and the move-in request is not issued. Even if the first to third move-in buffers other than the zero-th move-in buffer are vacant and ways other than the replace way of the command 1 have not been registered in the move-in buffer, the acquisition of the move-in buffer and the issuance of the move-in request are not allowed. Consequently, after the move-in request of the command 1 is completed and the zero-th move-in buffer is opened, the index of the command 8 does not become the same index (same index address) as that of executing move-in request that has been registered in the move-in buffer. Then, the move-in buffer is acquired, and the move-in request is issued.

The above problem also results from a reduction in the operating time between the stages of the cache pipeline with an increase in the operating frequency of the processor. For example, in order to issue move-in requests for the same index and different ways in parallel, it may be necessary to complete, in a single stage (one clock cycle) of the cache pipeline, the extraction of way information of the entries having the same index address from all the move-in buffers and the acquisition of the move-in buffer after determining ways to which any move-in requests have not been issued.

However, due to an increase in the operating frequency, it is difficult to complete such complicated processing in one stage.

(Embodiment)
(Configuration of Cache)

Figure 6:
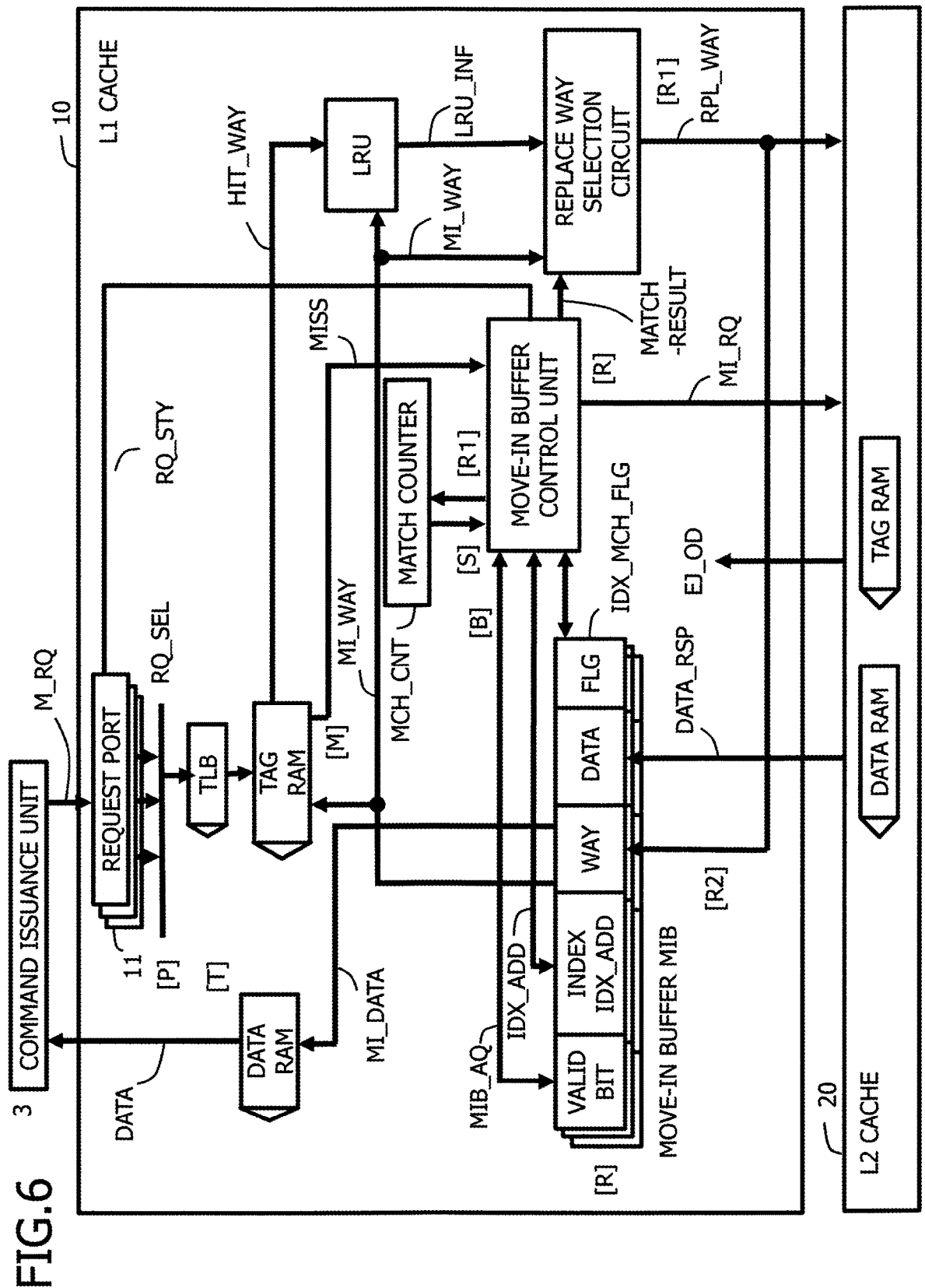
FIG. 6 is a diagram illustrating the configurations of an L1 cache and an L2 cache in an embodiment.

FIG. 6 is a diagram illustrating the configurations of an L1 cache and an L2 cache in an embodiment. The configurations of the L2 cache and an L3 cache to which the embodiment is applied are also the same. The configurations of the L3 cache and a memory access controller MAC to which the embodiment is applied are also the same except that a cache memory is not provided in the memory access controller MAC.

First, the configuration of the L1 cache 10 of FIG. 6 is different from that of the L1 cache of FIG. 2 in that a match counter MCH_CNT for counting the number of the move-in requests of the same index (same index address) that has been registered in a move-in buffer is provided. Then, a move-in buffer control unit MIB_CN determines to acquire the move-in buffer when a memory access request in which a cache miss has occurred has the same index (hereinafter called the same index) as that of any move-in request that has been registered in the move-in buffer and the count value of the match counter indicates that the number of the move-in requests of the same index that has been registered in the move-in buffer is less than the number of the ways of a cache memory. On the other hand, the move-in buffer control unit MIB determines not to acquire the move-in buffer when the memory access request has the same index as that of any move-in request that has been registered and the count value of the match counter indicates that the number of the move-in requests of the same index that has been registered in the move-in buffer has reached the number of the ways of the cache memory.

Second, a replace way selection circuit RPL_SEL selects the replace way of a move-in request issued for the memory access request of the same index from among ways other than the way of the move-in request of the same index that has been registered in the move-in buffer. Therefore, the way information MI_WAY of the move-in request that has been registered in the move-in buffer is supplied to the replace way selection circuit.

In addition, the matching result of an index match determination circuit provided in the move-in buffer control unit is supplied to the replace way selection circuit. From this matching result and the way information MI_WAY of the move-in request, information on the way of the move-in request of the same index that has been registered in the move-in buffer is acquired.

Preferably, the valid bits of the respective ways of the same index of a tag memory TAG_RAM are also supplied to the replace way selection circuit. Further, when ways having the invalid bids of the four ways of the same index of the tag memory correspond to ways other than the way of the move-in request that has been registered in the move-in buffer, a prescribed way is selected from among these ways as a replace way without depending on LRU information. This corresponds to a case 1 that will be described later.

More preferably, LRU information LRU_INF is also supplied to the replace way selection circuit, and a replace way is selected, based on the LRU information, from among ways other than the way of the move-in request of the same index that has been registered in the move-in buffer, which corresponds to a case 2 that will be described later.

The above match counter is incremented by one, for example, when the move-in buffer is acquired for a memory access request for the same index as that of the move-in request that has been registered in the move-in buffer. In addition, the match counter is decremented by one when the move-in buffer is opened after response data for the move-in request of the same index has been registered in the cache. That is, the match counter counts the number of the move-in requests of the same index that has been registered in the move-in buffer.

The move-in buffer control unit according to the embodiment determines whether the index address of a memory access request in which a cache miss has occurred matches an index address that has been registered in the move-in buffer. On the other hand, the move-in buffer control unit does not determine whether the replace way of a new move-in request matches the replace way of the move-in request of the same index that has been registered in the move-in buffer. Instead, the move-in buffer control unit determines whether the count value of the match counter has reached the number of the ways of the cache memory, i.e., whether the count value of the match counter has been less than the number of the ways of the cache memory. When the count value of the match counter has been less than the number of the ways of the cache memory, the move-in buffer control unit acquires the move-in buffer with the determination that the issuance of the move-in request of the same index is allowed. Otherwise, the move-in buffer control unit suppresses the acquisition of the move-in buffer.

By managing the match counter in the manner described above, the move-in buffer control unit may determine at lease if the issuance of a move-in request to the same index being possible or not, based on whether the count value of the match counter has been less than the number of the ways. In addition, the determination with the count value of the match counter is completed in a short period of time. However, a determination as to which way the replace way selection circuit may issue a move-in request is performed later. That is, the replace way selection circuit selects the way of a new move-in request from among ways other than the way of the move-in request of the same index that has been registered.

Accordingly, in the embodiment, the move-in buffer control unit may issue the move-in request of the same index to different replace ways in a short period of time with a cache pipeline configuration using a high-frequency clock.

Unlike FIG. 2, an index match flag IDX_MCH_FLG is registered in the move-in buffer MIB to perform the decrement processing of the match counter in the L1 cache 10 of FIG. 6. That is, the move-in buffer control unit sets the index match flag at "1" when acquiring the move-in buffer to issue the move-in request of the same index. At the same time, the move-in buffer control unit increments the match counter by one. Further, when the index match flag of the move-in buffer for a data response is "1," the move-in buffer control unit decrements the match counter by one. Normally, since the index (number) of the move-in buffer is given for a move-in request, the index match flag of the move-in buffer of the index is referred. When the index match flag is "1," the match counter is decremented by one.

The configurations of the L1 cache of FIG. 6 are the same as those of the L1 cache of FIG. 2 except for the configuration described above. Accordingly, the descriptions of the configurations of the L1 cache of FIG. 6 same as those of the L1 cache of FIG. 2 will be omitted. However, in FIG. 6, the positions of the respective stages P, T, M, S, B, R, R1, and R2 of the cache pipeline are illustrated. The stages will be described in detail in the operation of the L1 cache of FIG. 6 below.

FIG. 7 is a diagram illustrating an example of the move-in buffer MIB. The move-in buffer stores, in each of the entries of move-in buffer numbers, a valid bit VALID, an index address IDX_ADD, a replace way number WAY, data DATA, and an index match flag IDX_MCH_FLG indicating whether the move-in request of the same index has been issued. For example, the valid bit VALID is denoted by "1" to express a valid state, and denoted by "0" to express an invalid state. For example, the index match flag IDX_M-CH_FLG is denoted by "1" when the move-in request of the same index has been issued, and denoted by "0" when the move-in request of the same index has not been issued. Further, the index address IDX_ADD stores the index address ADD_2 of a memory access request. A way number selected by the replace way selection circuit in the replace way number WAY. At a time at which the move-in request is issued, information other than the data DATA is stored. After a data response, response data is stored in the data DATA.

(Operation of Cache)

Next, the operation of the L1 cache of FIG. 6 will be described. Although partially overlapping with the operation of FIG. 2, the operation including the overlap will be described.

Figure 8:
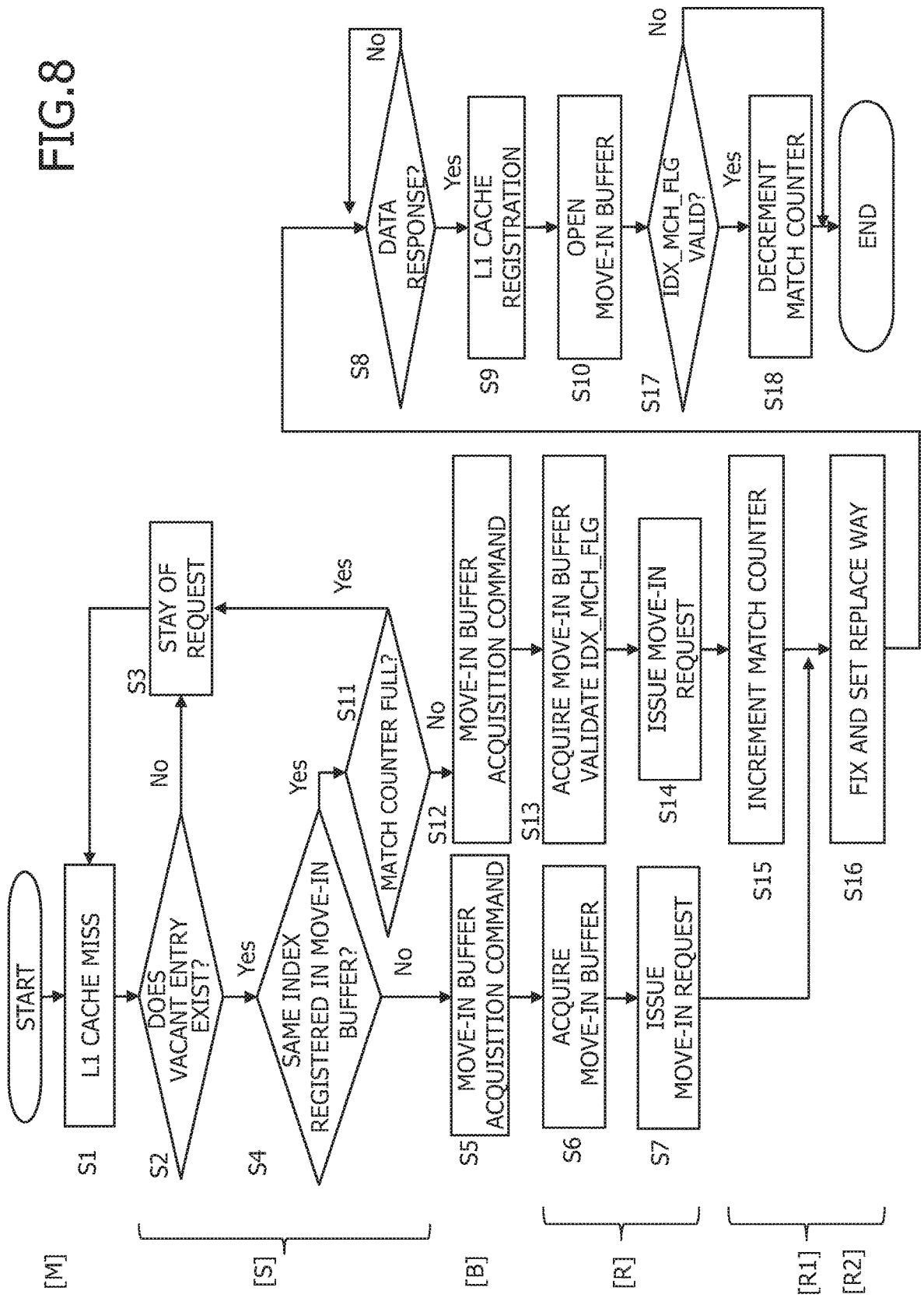
FIG. 8 is a flowchart diagram illustrating the operation of the L1 cache of FIG. 6.
Figure 9:
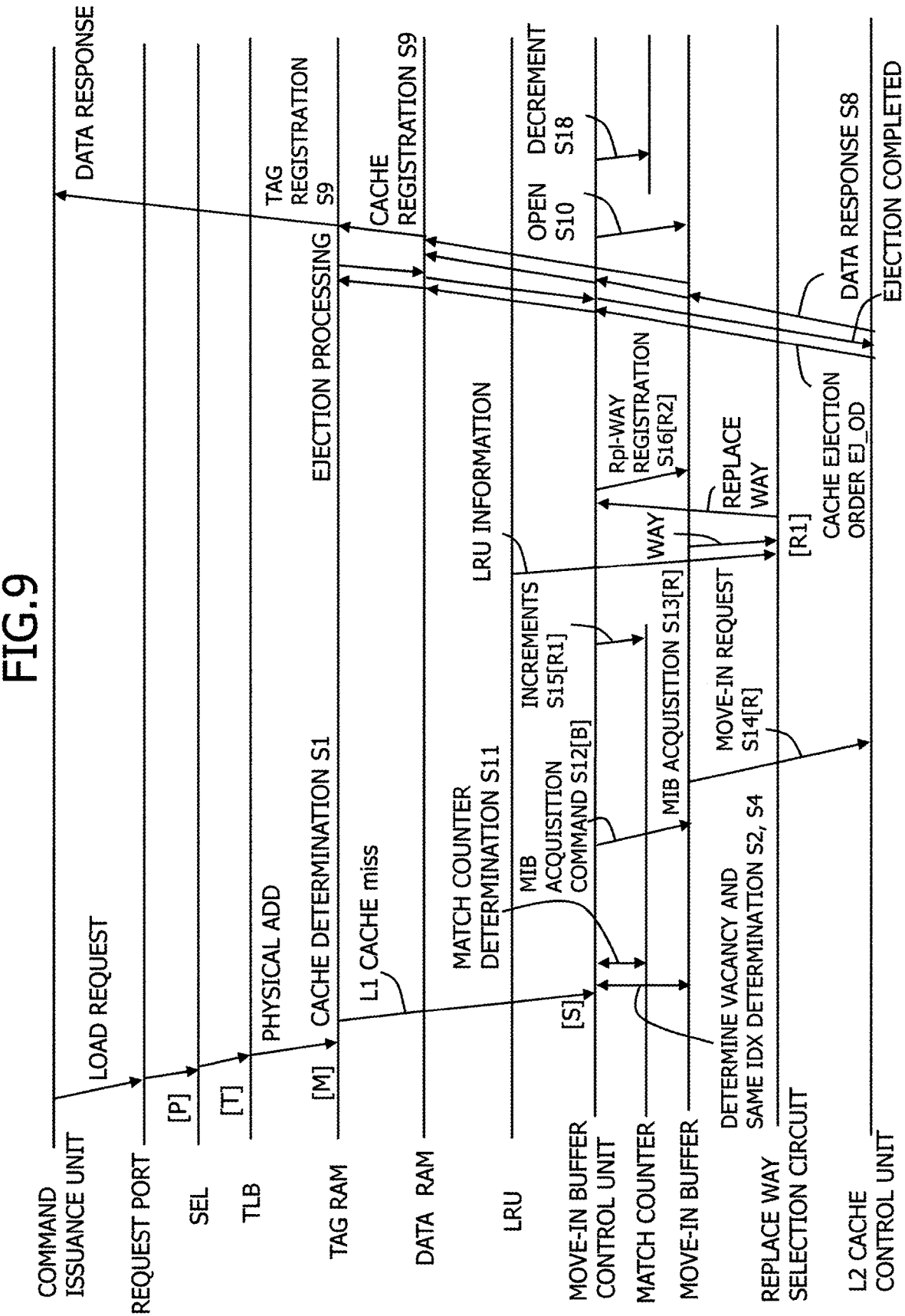
FIG. 9 is a sequence diagram illustrating the operation of the L1 cache of FIG. 6.

FIG. 8 is a flowchart diagram illustrating the operation of the L1 cache of FIG. 6. FIG. 9 is a sequence diagram illustrating the operation of the L1 cache of FIG. 6. In FIGS. 8 and 9, the stages P, T, M, S, B, R, R1, and R2 of the cache pipeline are illustrated.

The respective stages of the cache pipeline are as follows.

P stage: A determination is made as to whether a command is input to the pipeline.

T stage: An address is converted (from a logical address into a physical address) by a TLB to access a tag memory and a data memory.

M stage: A determination is made as to whether a cache hit occurs.

S stage: When the cache hit occurs, data on four ways is read. Then, data on a way number having a matching address is selected and output. When a cache miss occurs, a determination is made as to whether any vacancy exists in the move-in buffer and a determination is made as to whether an index address matches. When both the above determinations are true, a determination is made as to whether the count value of the match counter has reached the number of ways.

B stage: When the cache hit occurs, data is returned to a command issuance unit. When the cache miss occurs, the assurance of the move-in buffer is commanded if the count value of the match counter has not reached the number of the ways. If the count value of the match counter has reached the number of the ways, the acquisition of the move-in buffer is suppressed to command the stay of a memory access request.

R stage: When the cache hit occurs, the command issuance unit is notified of the access result of the memory access request to end the memory access request. When the cache miss occurs, the move-in buffer is assured (the valid bit is set at "1", the index address is registered, and the index match flag is set at "1" when the index address matches) to issue a move-in request.

R1 stage: When the cache miss occurs, the match counter is incremented to fix a replace way.

R2 stage: When the cache miss occurs, the replace way is registered in the move-in buffer.

After R3 stage: When the cache miss occurs, reading of the replace way from the move-in buffer is allowed. The reception of a data response from the L2 cache is expected.

Next, the operation of the L1 cache will be described with reference to FIGS. 8 and 9. First, when a memory access request issued from the command issuance unit is input to the cache pipeline by a request selection circuit RQ_SEL (P stage), the logical address of the memory access request is converted into a physical address by the TLB (T stage). Then, the tag memory TAG_RAM determines the occurrence of a cache hit (S1, M stage). Then, when a cache miss occurs, the move-in buffer control unit MIB_CN receives an L1 cache miss MISS.

The move-in buffer control unit determines whether any vacant entry exists in the move-in buffer MIB (S2, S stage). Like FIG. 4, this determination is made in such a manner as to check the valid bits of all the entries of the move-in buffer MIB. When no vacant entry exists, the acquisition of the move-in buffer is not allowed. Therefore, the issuance of a move-in request is not allowed for the memory access request in which the cache miss has occurred. Therefore, the move-in buffer control unit returns the memory access request in which the cache miss has occurred to request ports 11 (stay request RQ_STY in FIG. 6) (S3), and the memory access request is suppressed from being input to the cache pipeline until a next time.

In addition, the move-in buffer control unit determines whether an index address IDX_ADD corresponding to the same index as that corresponding to the index address ADD_2 of the memory access request has been registered in the move-in buffer (S4, S stage). This determination may be made by, for example, an index match determination circuit that determines the matching between each of all the index addresses IDX_ADD in the move-in buffer MIB and the index address ADD_2 of the memory access request.

When the move-in request of the same index (i.e., the same index address) as that of the memory access request in which the cache miss has occurred has not been registered in the move-in buffer MIB (NO in S4), the move-in buffer control unit issues a command for acquiring the move-in buffer (S5, B stage). Then, the move-in buffer control unit acquires the move-in buffer in which information on the move-in request is to be written (S6, R stage), and issues the move-in request (S7, R stage).

On the other hand, when the move-in request of the same index (i.e., the same index address) as that of the memory access request has been registered in the move-in buffer MIB (YES in S4), the move-in buffer control unit determines whether the count value of the match counter has reached the number of the ways of the cache memory (the count value of the match counter has been full) in the L1 cache of FIG. 6 (S11, S stage). The determination with the match counter in FIG. 6 is a difference between FIG. 2 and FIG. 6. This determination by the match counter is a different feature from that in FIG. 2.

When the count value of the match counter has reached the number of the ways (YES in S11), the move-in buffer control unit returns the memory access request to request ports 11 without acquiring the move-in buffer (S3). On the other hand, when the count value of the match counter has not reached the number of the ways (NO in S11), the move-in buffer control unit issues a move-in buffer acquisition command MIB_AQ (S12, B stage).

In other words, in the stages S, when any vacant entry exists (YES in S2), the move-in request of the same index as that of the memory access request has been registered in the move-in buffer (YES in S4), and the count value of the match counter has not reached the number of the ways (NO in S11), the move-in buffer control unit issues the move-in buffer acquisition command MIB_AQ (S12). Thus, the move-in buffer control unit sets the valid bit of the vacant entry of the move-in buffer at a valid state, i.e., "1" to acquire the move-in buffer (S13, R stage). In acquiring the move-in buffer, the move-in buffer control unit registers the index address ADD_2 of the memory access request in the region of the index address IDX_ADD of the move-in buffer and sets the index match flag IDX_MCH_FLG at "1" for validation (S13, R stage).

After that, the move-in buffer control unit increments the match counter MCH_CNT by one (S15, R1 stage).

Then, by the stage R1, the replace way selection circuit RPL_SEL determines which way has been registered as a replace way by the move-in request of the same index based on way information MI_WAY in the move-in buffer and information, from the move-in buffer control unit, as to which number of the move-in buffer has the same index address IDX_ADD. Then, the replace way selection circuit RPL_SEL selects the replace way of a newly issued move-in request from among ways other than the way of the move-in request of the registered same index (R16, R1 stage), and registers the selected replace way in the move-in buffer (S16, R2 stage). As an example, the replace way selection circuit RPL_SEL selects the invalid way of the tag memory or the oldest way of the LRU information LRU_INF as the replace way from among the ways other than the way of the move-in request of the same index.

Then, the L1 cache 10 receives a data response from an L2 cache 20 (YES in S8). Data received from the L2 is stored in the data region DATA of the corresponding entry of the move-in buffer MIB. In addition, the data of the data response is registered in a block to be replaced in the cache memory based on the index address registered in the move-in buffer and the replace way (S9). After the registration of the data in the L1 cache memory, the move-in buffer control unit invalidates the valid bit of the entry of the move-in buffer to open the entry (S10).

When the index match flag IDX_MCH_FLG of the entry of the move-in buffer is set at "1" (YES in S17), the data of the data response is data for the move-in request of the same index. Therefore, the move-in buffer control unit decrements the match counter by one (S18).

Note that as illustrated in FIG. 9, the L2 cache issues, to the L1 cache, an order EJ_OD for ejecting data on the replace way of the index to the L2 cache memory before the data response by the L1 cache when valid data has been registered in the replace way of the cache memory. After the ejection of the data is completed, the response data from the L2 cache is registered in the replace way of the L1 cache. Finally, the L1 cache 10 returns the data to the command issuance unit 3.

Figure 10:
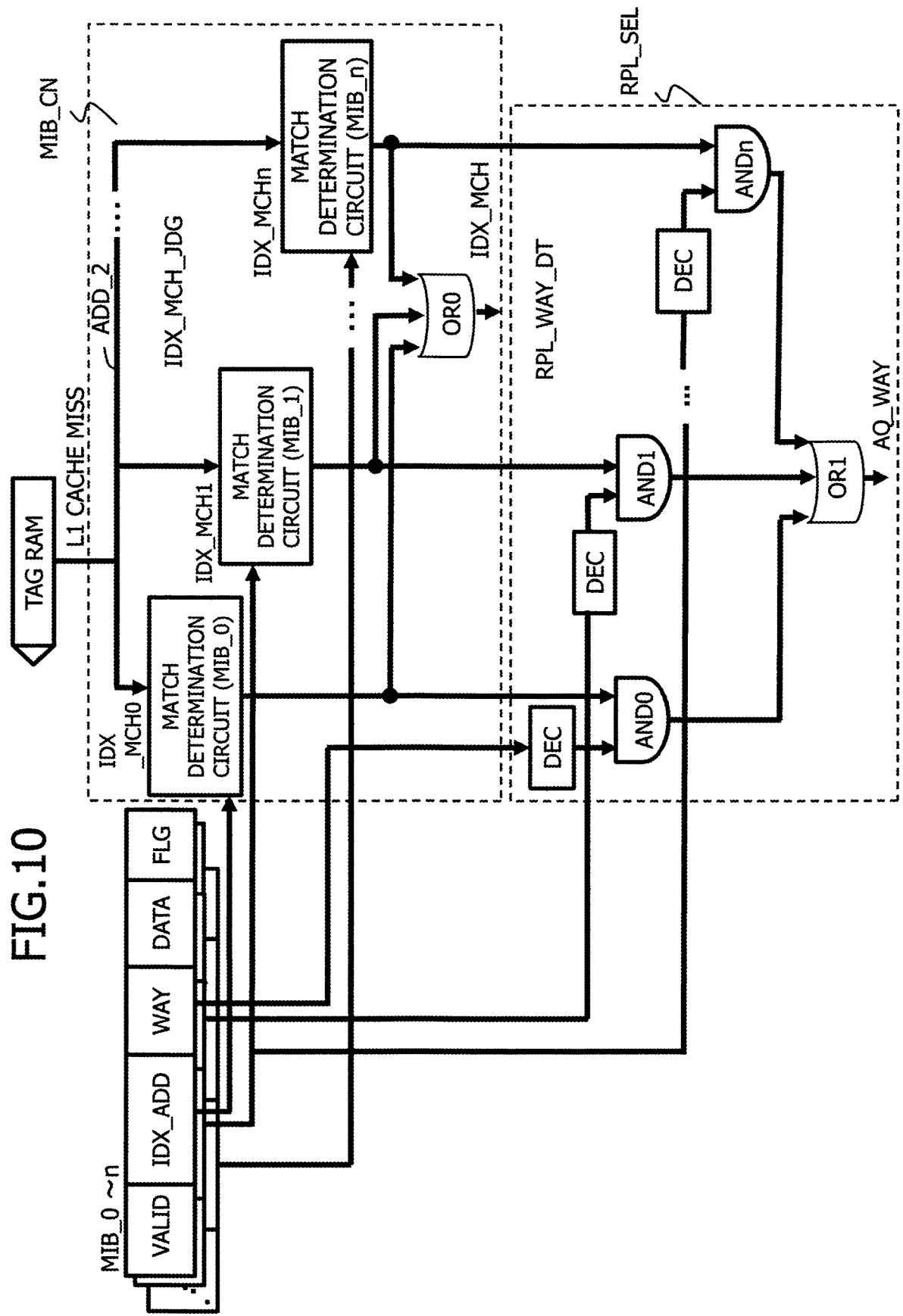
FIG. 10 is a diagram illustrating the index match determination circuit in the move-in buffer control unit and a replace way detection circuit for the move-in request of the same index in the replace way selection circuit.

FIG. 10 is a diagram illustrating the index match determination circuit in the move-in buffer control unit and a replace way detection circuit for the move-in request of the same index in the replace way selection circuit. The index match determination circuit IDX_MCH_JDG in the move-in buffer control unit MIB CN has n+1 match determination circuits MCH0 to MCHn and a logical OR circuit OR0. The match determination circuits MCH0 to MCHn determine the matching between the index address ADD_2 of a memory access request in which a cache miss has occurred and each of all the index addresses IDX_ADD in the move-in buffer MIB. The logical OR circuit OR0 is a logical OR circuit that outputs an index match output IDX_MCH indicating the logical OR of the outputs ("1": matching, "0": nonmatching) of the match determination circuit. With the index match output IDX_MCH of the index match determination circuit IDX_MCH_JDG, the move-in buffer control unit MIB_CN determines whether the index address ADD_2 of the memory access request in which the cache miss has occurred matches the index address IDX_ADD of any move-in request that has been registered in the move-in buffer MIB (S4).

The replace way detection circuit RPL_WAY_DT for the move-in request of the same index in the replace way selection circuit RPL_SEL has decoders DEC that decode the replace way of the move-in buffer MIB, AND circuits AND0 to ANDn that output the respective logical products of the outputs of the respective match determination circuits MCH0 to MCHn and the outputs of the respective decoders, and a logical OR circuit OR1 that outputs the logical OR of the outputs of the AND circuits.

When there are four ways, the decoders DEC convert the replace way number "10" into the code "0100" indicating that the third way is a replace way. Therefore, it is indicated that the position of "1" of a four-bit code is the position of a replace way. Further, each of the AND circuits AND0 to ANDn outputs any of the code "1" obtained by decoding a replace way number when an index address matches and the code "0" when the index address nonmatches. Further, the respective AND circuits AND0 to ANDn output the code "0000" in which all the four bits are zero when the index address nonmatches, and output "0100" when the index address matches and the code is "0100." Further, the logical OR circuit OR1 outputs the logical OR of the outputs of n+1 AND circuits. That is, a four-bit code output from the logical OR circuit OR1 indicates the positions of all the replace ways of the move-in request of the same index that has been registered.

FIG. 11 is a diagram illustrating the truth tables of the replace way selection circuit. As illustrated in FIG. 10, the replace way detection circuit RPL_WAY_DT in the replace way selection circuit RPL_SEL receives a move-in buffer number having the same index address IDX_ADD as the index address ADD_2 of a memory access request in which a cache miss has occurred from the move-in buffer control unit MIB_CN, and extracts way information that has been acquired by the move-in request of the same index based on way information in the move-in buffer. In addition, the replace way detection circuit RPL_WAY_DT receives way information invalid in the same index from the tag memory of the L1 cache, and further receives LRU information from an LRU circuit. The way information being invalid in the same index is a way number indicating that valid data has not been registered in the L1 cache memory.

First, when an invalid way exists at the same index in the tag memory of the L1 cache, the replace way selection circuit selects a replace way (RPL_WAY) based on a truth table illustrated in the case 1 of FIG. 11. The case 1 illustrates the combinations (patterns 1-1 to 1-4) of ways that satisfy two conditions in which four ways (W0, W1, W2, and W3) are invalid at the same index in the tag memory and have not acquired the move-in buffer, and illustrates replace ways (RPL_WAY) corresponding to the respective patterns.

As illustrated in the truth table, in the case 1, the replace way selection circuit detects a way that is invalid in the same index of the tag memory and that has not been selected as a replace way by the move-in request of the same index in the move-in buffer. When a way that satisfies the two conditions exists, the replace way selection circuit selects the way that satisfies the two conditions as a replace way (RPL_WAY)

based on the truth table of the case 1. Since the way is invalid in the tag memory, it is not subjected to selection based on LRU information.

Note that in the truth table of the case 1 of FIG. 11, low-numbered ways are selected preferentially. For example, when the way that satisfies the two conditions is the way W0 in the pattern 1-1, the replace way selection circuit selects the way W0 as a replace way regardless of the other ways (W1, W2, and W3). When the way W0 does not satisfy the two conditions but the way W1 satisfies the two conditions in the pattern 1-2, the replace way selection circuit selects the way W1 as a replace way regardless of the other ways (W2 and W3). The same applies to cases 1-3 and 1-4. However, high-numbered ways may be selected preferentially, or ways may be selected randomly.

In the case of the case 1, since valid data has not been registered in the invalid ways of the tag memory, the L1 cache is not caused to perform an ejection order for ejecting the data to the L2 cache. Accordingly, when a way invalid in the tag memory has not acquired the move-in buffer (the way has satisfied the two conditions), the replace way selection circuit absolutely selects the way as a replace way.

In the case 1, another reason why the replace way selection circuit selects the way that satisfies the two conditions as a replace way is as follows. Even if a way is invalid in the tag memory about the same index, there is a case that the way is registered in the move-in buffer as the way of a move-in request that has been issued. For example, there is a case that a way invalid in the tag memory exists but a preceding memory access request in which a cache miss has occurred has acquired the move-in buffer about the same way. In this case, the replace way selection circuit does not select the way as a replace way.

Second, when no invalid way exists in the same index of the tag memory of the L1 cache, the replace way selection circuit selects a replace way based on a truth table illustrated in the case 2 of FIG. 11. Since no invalid way exists in the same index of the tag memory of the L1 cache in the case 2, all ways have valid data registered therein. Accordingly, it may be necessary to perform an ejection order for ejecting a replace way. Therefore, in the case 2 the replace way selection circuit selects the earliest-accessed way based on LRU information as a replace way from among ways other than the way (way that has not acquired the move-in buffer) of the same index address in the move-in buffer.

In the case 2, LRU truth tables (1) to (11) for reference (patterns 2-1 to 2-11) or replace ways (patterns 2-12 to 2-15) are indicated for each of the 15 types of way combinations (patterns 2-1 to 2-15) that have acquired the move-in buffer about the four ways. In the truth tables, ways that have acquired the move-in buffer are denoted by "1". Accordingly, ways that have not acquired the move-in buffer are denoted by "0."

The patterns 2-1 to 2-11 are cases in which a plurality of (four, three or two) ways that has not acquired the move-in buffer exists. In this case, as illustrated in the respective LRU truth tables (1) to (11), the replace way selection circuit selects the earliest-accessed way (way of the LRU) as a replace way (RPL_WAY) from among the ways that have not acquired the move-in buffer. On the other hand, since the patterns 2-12 to 2-15 have only one way that has not acquired the move-in buffer, the replace way selection circuit selects the way that has not acquired the move-in buffer as a replace way regardless of LUR information.

As described above, a timing at which the replace way selection circuit selects a replace way is the R1 stage, i.e., three stages after the S stage at which the move-in buffer control unit determines the acquisition of the move-in buffer. That is, during the three stages after the S stage, the replace way selection circuit extracts way information (MI_WAY) on a move-in request for the same index that has been registered in the move-in buffer and selects an appropriate replace way from among ways other than the way. As selection conditions, the replace way selection circuit selects a way invalid in the L1 cache as in the case 1, and selects the earliest-accessed way based on the LRU information as in the case 2 when no invalid way exists in the L1 cache.

Figure 12:
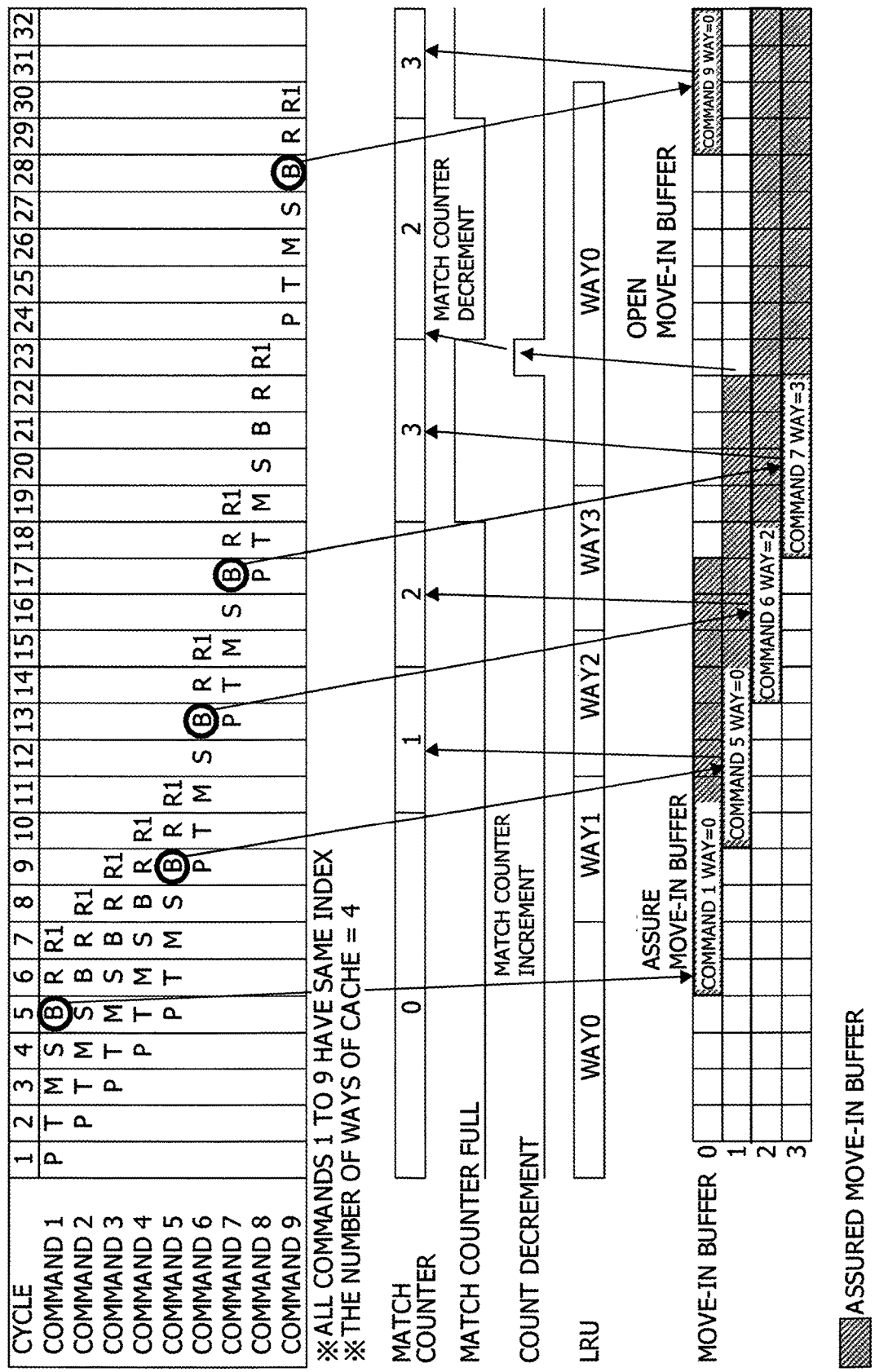
FIG. 12 is a timing chart diagram illustrating the control of the move-in buffer control unit of the L1 cache in the embodiment.

FIG. 12 is a timing chart diagram illustrating the control of the move-in buffer control unit of the L1 cache in the embodiment. FIG. 12 is a diagram corresponding to FIG. 5. FIG. 13 is a diagram illustrating the stage and the operation of each command for each cycle of FIG. 12. FIGS. 12 and 13 are on the assumption that all the commands 1 to 9 have the same index address ADD_2, the number of ways is four, no invalid way exists at the same index in the tag memory of the L1 cache, and four move-in buffers are provided. In addition, the move-in buffer control unit is provided with only one match counter MCH_CNT, and the one match counter is shared by a plurality of indexes or exclusively used by the initially generated same index. Since all the commands have the same index address, one match counter is substantially exclusively used by one index in the operation of FIG. 12 even if the one match counter is configured to be shared by different indexes.

FIG. 12 illustrates commands 1 to 5 input to the L1 cache for each cycle and commands 6 to 9 input later by four cycles after an adjacent command. Here, a command issued by the command issuance unit is a load command, and a memory access request is correspondingly input to the L1 cache. In addition, FIG. 12 illustrates the count values of the match counter, a match counter full flag (flag indicating whether the count value of the match counter indicates that the number of the move-in requests of the same index in the move-in buffer has reached the number of the ways of the cache), a count decrement signal for decrementing the match counter, LRU information, and commands and way numbers that have acquired the move-in buffer.

FIG. 13 illustrates commands in cycles 3 to 31 and the stages and the operations of the commands. In addition, FIG. 13 illustrates information W0 to W3 (1: the ways have been registered) on ways that have been registered in the move-in buffer in the respective cycles, and the values (3: the number of move-in requests has reached the number of the ways of the cache) of the match counter MC.

First, for the command 1, the move-in buffer control unit reaches the S stage in the cycle 4, and it is determined that the count value of the match counter is not full. Therefore, it is detected by the move-in buffer control unit that the issuance of a move-in request is allowed, and a command for acquiring the zero-th move-in buffer is issued at the B stage of the cycle 5. Then, the move-in buffer control unit selects the way 0 as a replace way at the R1 stage of the cycle 7.

Next, for the command 5, the move-in buffer control unit reaches the S stage in the cycle 8, and it is determined that the count value of the match counter is not full. Therefore, it is detected by the move-in buffer control unit that the issuance of a move-in request is allowed, and a command for acquiring the first move-in buffer is issued at the B stage of the cycle 9. Then, the move-in buffer control unit selects the way 1 as a replace way (RPL_WAY) at the R1 stage of the cycle 11. The command 5 acquires the move-in buffer with the same index as that of the command 1 that has precedingly acquired the move-in buffer, and thus the match counter is incremented at the R1 stage of the cycle 11. As a result, the count value of the match counter becomes "1."

In the example of the embodiment, the count value of the match counter is a value smaller than the number of the move-in requests of the same index that has been registered in the move-in buffer. That is, the move-in requests of the above commands 1 and 5 are the move-in requests of the same index. At a time at which the command 5 has acquired the move-in buffer, the number of the move-in requests of the same index that has been registered in the move-in buffer is "2." However, the match counter is not incremented until a memory access request in which a cache miss has occurred is determined to have the same index as that of any move-in request that has been registered in the move-in buffer. Therefore, the count value of the match counter becomes "1" in the second command 5, and becomes smaller by one than the number of the move-in requests "2" of the same index that has been registered in the move-in buffer. That is, when the count value of the match counter is N, the number of the move-in requests of the same index that has been registered in the move-in buffer is N+1. Therefore, when the count value of the match counter becomes WAY−1, it is indicated that the number of the move-in requests of the same index has reached the number of all ways.

Similarly, the command 6 issues a command for acquiring the second move-in buffer at the B stage of the cycle 13, the way 2 is selected as a replace way (RPL_WAY) at the R1 stage of the cycle 15, and the match counter is incremented. In addition, the command 7 issues a command for acquiring the third move-in buffer at the B stage of the cycle 17, the way 3 is selected as a replace way (RPL_WAY) at the R1 stage of the cycle 19, and the match counter is incremented. Here, the count value of the match counter reaches "3" indicating that the number of the ways is four, and the count value of the match counter becomes full. That is, in this example, it is indicated that all the four ways have acquired the move-in buffer when the count value of the match counter reaches "3" (=the number of ways−1).

The next command 8 is suppressed from acquiring the move-in buffer since the count value of the match counter is full at the S stage of the cycle 20, and caused to stay in the cycle 23. In FIG. 12, the move-in buffer of the command 1 is opened in the cycle 18. However, since the index match flag of the move-in buffer is "0," the match counter is not decremented. Therefore, in the cycle 20, the count value of the match counter remains "3," and the match counter remains full. As a result, the acquisition of the move-in buffer is suppressed at the command 8.

On the other hand, the move-in buffer of the command 5 is opened in the cycle 23, the count decrement signal becomes an H level since the index match flag is "1," the match counter is decremented, and the full state of the match counter is cancelled. As a result, the next command 9 acquires the move-in buffer at the B stage of the cycle 28 since the count value of the match counter is not full at the S stage of the cycle 27. Thus, the count value of the match counter becomes full at the cycle 30 again.

The incrementing and decrementing control of the match counter of the embodiment may be changed so that the match counter is decremented when the count value of the match counter matches the number of the move-in requests of the same index that has been registered in the move-in buffer and the move-in buffer for the move-in requests of the same index is opened. With such a match counter, the command 8 is allowed to acquire the move-in buffer since the match counter is also decremented when the move-in buffer of the above command 1 is opened. As a specific example, in a case in which the match counter is exclusively used by a single index, a buffer that stores the same index when the match counter is first incremented from "0" is provided in the exclusive match counter. When the move-in buffer corresponding to a move-in request is opened, the exclusive match counter is decremented if the index of the move-in request matches the same index of the exclusive match counter.

In the above operating example, the command 1 acquires the move-in buffer to issue the move-in request. However, the commands 2, 3, and 4 input for each cycle after the command 1 are not allowed to acquire the move-in buffer, and thus the move-in request is caused to stay without being issued. This is because a replace way is set in the move-in buffer at the R2 stage after the memory access request of the command 1 acquires the move-in buffer at the R stage and reading of the replace way in the move-in buffer is allowed after the R3 stage. Accordingly, during three cycles from the R stage at which the preceding command acquires the move-in buffer to the R3 stage at which reading of the replace way is allowed, the following command for the same index is suppressed from acquiring the move-in buffer. The commands 2, 3, and 4 correspond to this case. Assuring the move-in buffer is suppressed at, for example, the S stage of the preceding command.

In FIG. 5, for the memory access request of the same index as that of any move-in request that has been registered in the move-in buffer, the move-in buffer is suppressed from being acquired even if a way other than the replace way of the move-in request for the same index that has been registered has not been registered in the move-in buffer. In FIG. 12, the acquisition of the move-in buffer is allowed if a way other than the replace way of the move-in request for the same index that has been registered has not been registered in the move-in buffer. Accordingly, for many memory access requests in which a cache miss has occurred, the acquisition of the move-in buffer and the issuance of the move-in request are allowed.

In addition, the necessity of acquiring the move-in buffer is determined based on whether the number of the move-in requests of the same index that has been registered in the move-in buffer (a number indicated by the count value of the match counter) has reached the number of the ways of the cache memory. Therefore, the necessity of acquiring the move-in buffer may be determined in a short clock cycle. When the match counter full flag indicating that the count value of the match counter has reached the number of the ways is recorded in advance, the above necessity of acquiring the move-in buffer may be immediately determined by the match counter full flag.

(Modified Example of the Number of Match Counters and Shared Use and Exclusive Use of Match Counter in Embodiment)

Next, the number of match counters and the shared use and the exclusive use of the match counter by different index addresses will be described based on three match counter examples. Operation examples illustrated in FIGS. 14, 15, and 16 are on the assumption that 16 move-in buffers are, for example, provided unlike the above case in which the four move-in buffers are provided.

(First Match Counter Example)

In a first match counter example, the L1 cache has only one match counter, and the one match counter is shared by different index addresses. That, when the memory access request of the same index address ADD_A as that of a move-in request that has been registered in the move-in buffer acquires the move-in buffer, the one match counter is incremented. After that, when the memory access request of the same index address ADD_A is issued, the move-in buffer control unit suppresses the acquisition of the move-in buffer if the count value of the match counter has reached a value corresponding to the maximum number of ways or allows the acquisition of the move-in buffer if the count value of the match counter has not reached the value. In addition, when the memory access request of the same index address ADD_B is issued, the acquisition of the move-in buffer is determined based on the count value of the match counter. That is, not only the memory access request of the same index address ADD_A as that of a first move-in request that has been registered but also the memory access request of the index address ADD_B of a second move-in request that has been registered determine the necessity of acquiring the move-in buffer based on the value of the shared match counter. When the move-in buffer is acquired, the shared match counter is incremented.

However, in general, it is likely that the same index address repeatedly causes a cache miss in a short period of time, but is unlikely that each of different index addresses repeatedly causes a cache miss. Accordingly, even if one match counter is shared by different index addresses, all a plurality of ways of the L1 cache may be allocated to a plurality of move-in requests under a situation in which all memory access requests in a short period of time are focused on the same index address as illustrated in FIG. 12. With the one match counter, circuit resources for the match counter may be reduced.

FIG. 14 is a diagram illustrating an operating example in a case in which one match counter is shared by different index addresses in the first match counter example. It is assumed that all move-in buffers are vacant in an initial state. In addition, it is assumed that commands 1 to 9 are sequentially issued and all memory access requests for the commands cause a cache miss. FIG. 14 illustrates the index addresses, the values of the match counter, the issuance or stay of a move-in request, and the index addresses that have acquired the move-in buffer of the respective commands in respective rows.

The command 1 has the index address A, and the move-in buffer is vacant. Therefore, the move-in buffer control unit assures the move-in buffer and issues a move-in request for the memory access request of the command 1. The match counter remains "0" like FIG. 12.

The command 2 also has the index address A, and the index address A of the move-in request for the command 1 has been registered in the move-in buffer. Since the count value of the match counter is not full (a state in which the number of ways −1), the move-in buffer control unit acquires the move-in buffer and issues a move-in request. In addition, the move-in buffer control unit increments the match counter, and thus the count value of the match counter becomes "1."

The commands 3 and 4 have the index addresses are B and C, respectively. Therefore, the move-in buffer control unit acquires the move-in buffer and issues a move-in request for each of the commands.

The command 5 has the index address is B, and the same index address B has been registered in the move-in buffer. Therefore, the move-in buffer control unit refers to the count value of the match counter to acquire the move-in buffer and issue a move-in request. Then, the move-in buffer control unit increments the match counter, and thus the count value of the match counter becomes "2." That is, the same index addresses A and B are different from each other but share the match counter.

The command 6 has the index address is A, and the same index address A has been registered in the move-in buffer. Therefore, the move-in buffer control unit refers to the count value of the match counter to acquire the move-in buffer and issue a move-in request. Then, the move-in buffer control unit increments the match counter, and thus the count value of the match counter becomes "3." As a result, the match counter counts the move-in requests of the commands 2 and 6 that set two ways as replace ways for the same index address A, and further counts the move-in request of the command 5 that sets one way as a replace way for the same index address B. However, in the embodiment, the match counter does not count the move-in requests of the first command 1(A) and the command 3(B).

After that, the commands 7, 8, and 9 attempt to acquire the move-in buffer for index addresses C, A, and A, respectively. However, since any of the index addresses has been registered in the move-in buffer and the count value of the match counter becomes the maximum way number "3," i.e., full, the acquisition of the move-in buffer is suppressed.

In the first match counter example, only the one match counter is provided to minimize the circuit resources of the cache. However, the move-in buffer is acquired for the index address B of the command 5, and the match counter is incremented. Therefore, the fourth command 8 of the index address A is suppressed from acquiring the move-in buffer since the count value of the match counter is full (maximum value). However, at least the three commands (commands 1, 2, and 6) of the index address A may acquire the move-in buffer.

(Second Match Counter Example)

In a second match counter example, the L1 cache has only one match counter, and the match counter is exclusively used by the same index address that is first generated. That is, the memory access request of the same index address as that of a move-in request that has been registered and allowed to acquire the match counter may acquire the move-in buffer in all ways using the match counter. However, the memory access requests of other same index addresses that have not been allowed to acquire the match counter are not capable of acquiring the move-in buffer in all ways using the match counter. In addition, when the count value of the match counter becomes 0 with a data response, the exclusive state of the match counter is cancelled.

FIG. 15 is a diagram illustrating an operating example in a case in which one match counter is exclusively used by a specific index address in the second match counter example. Like FIG. 14, it is assumed that all move-in buffers are vacant in an initial state. In addition, it is assumed that commands 1 to 9 are sequentially issued and all memory access requests for the commands cause a cache miss.

The index addresses of the commands 1 to 9 are the same as those of the first match counter example of FIG. 14, and the commands 10 to 12 of the index address B are added.

The operation of acquiring the move-in buffer of the commands 1 to 4 is the same as that of FIG. 14. However, since the index address A is the same as the index address A that has been registered in the move-in buffer at the command 2, one match counter is exclusively used by the index address A.

As a result, the acquisition of the move-in buffer using the match counter is not allowed at the command 5 of the index address B, the acquisition of the move-in buffer is suppressed, and the memory access request of the command 5 is caused to stay. This point is the difference between FIG. 14 and FIG. 15.

The commands 6 and 7 have the index addresses A and C, respectively. Since the count value of the match counter exclusively used by the index address A is not full at the command 6, the move-in buffer is acquired. The command 7 has the index address C, is not allowed to use the match counter, and is suppressed from acquiring the move-in buffer, and memory access request of the command 7 stays. Therefore, the memory access request of the command 7 is caused to stay.

The command 8 has the index address A. Since the count value of the exclusive match counter is not full, the move-in buffer is acquired. This point is also the difference between FIG. 14 and FIG. 15. However, at the command 9, the count value of the exclusive match counter becomes full. Therefore, the acquisition of the move-in buffer is suppressed.

After the command 9, it is assumed that a data response occurs in the three commands 2, 6, and 8 of the index address A. Thus, the count value of the match counter becomes "0" and is not exclusively used by the index address A. In addition, after issuance of the command 7 it is assumed that a data response occurs at the command 5 of the index address B.

Further, the commands 10, 11, and 12 have the index address B. In this case, the move-in buffer is acquired at the command 10, and the index address B is registered in the move-in buffer. Since the next command 11 is the memory access request of the same index address as that of the move-in buffer, the match counter is exclusively used by the index B. Further, both the commands 11 and 12 acquire the move-in buffer.

(Third Match Counter Example)

In a third match counter example, the L1 cache has two match counters, and the two match counters are respectively exclusively used by the two types of the same index addresses that are first generated. That is, an exclusive match counter is acquired by the memory access request of the same index address A that is first generated, and the second same index address B that is next generated is also allowed to acquire an exclusive match counter. Further, the memory access requests of the two types of the same index addresses A and B allowed to acquire their match counters may acquire the move-in buffers of the number of ways (=4) with the respective match counters. However, the memory access request of another same index address C that is not allowed to acquire its match counter is not capable of using the ways by the number of the ways with the match counter, and the issuance of the move-in requests of the same index address C in parallel is not allowed. In addition, like the second match counter example, the exclusive state of the match counters is cancelled when the count value becomes 0 with a data response.

FIG. 16 is a diagram illustrating an operating example in a case in which two match counters are exclusively used by the two types of the same index addresses that are first generated in the third match counter example. FIG. 16 is based on the same assumption as that of FIG. 14.

The index addresses of the commands 1 to 9 are the same as those of FIGS. 14 and 15. In this example, the command 2 of the index address A is the memory access request with the first same index address A, and the match counter MCH_CNT_0 is exclusively used by the index address A. Therefore, both the commands 6 and 8 of the index address A acquire the move-in buffer based on the exclusive match counter MCH_CNT_0.

On the other hand, the command 5 of the index address B is the second memory access request of the first same index address B, and the match counter MCH_CNT_1 is exclusively used by the index address B. Therefore, when the index address of a command (not illustrated) after the command 9 is B, the move-in buffer can be acquired based on the exclusive match counter MCH_CNT_1 even if a data response is not generated for the move-in request of the command 3 or the command 5.

Among the above three match counter examples, an example in which the move-in buffer is most efficiently acquired and the move-in request is most efficiently issued is preferably selected depending on a processor or a program to be executed.

As described above, according to the embodiment, a memory access request for the same index as that of a move-in request that has been registered in the move-in buffer determines whether the number of the move-in requests of the same index that has been registered is less than the number of the ways of the cache memory to determine the necessity of acquiring the move-in buffer. Accordingly, a plurality of move-in requests may be issued to the same index in parallel.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
    a memory access request issuance unit configured to issue a memory access request; and
    a cache including
        a cache memory that has a tag memory and a data memory,
        a move-in buffer control unit that is configured to issue a move-in request for requesting data of the memory access request when a cache miss occurs based on the memory access request,
        a move-in buffer having a plurality of entries for registering the move-in request,
        a match counter, and
        a replace way selection unit configured to select a replace way of the cache memory, in which response data of the move-in request issued for the memory access request is registered, from among ways other than a way of the move-in request, having an index same as the memory access request for which the move-in request is issued, that has been registered in the plurality of entries of the move-in buffer;
    the move-in buffer control unit, when the cache miss occurs based on the memory access request,
    acquires an entry of the plurality of entries of the move-in buffer, issues the move-in request and increments the match counter when the memory access request has a same index as an index of any move-in request that has been registered in the plurality of entries of the move-in buffer and a value of the match counter is less than a number of ways of the cache memory,
    does not acquire an entry of the plurality of entries of the move-in buffer and does not issue the move-in request when the memory access request has the same index and the value of the match counter reaches the number of the ways, decrements the match counter when opening the acquired entry of the move-in buffer after a data response for the move-in request issued for the memory access request having the same index, and the move-in buffer control unit acquires the entry of the plurality of entries of the move-in buffer, before the replace way selection unit selects the replace way of the cache memory.

2. The arithmetic processing device according to claim 1, wherein the replace way selection unit is configured to register the selected replace way in the acquired entry of the move-in buffer.

3. The arithmetic processing device according to claim 2, wherein the replace way selection unit preferentially selects, as the replace way, an invalid way in the cache memory from among the ways other than the way of the move-in request, issued for the memory access request having the same index, that has been registered in the plurality of entries of the move-in buffer.

4. The arithmetic processing device according to claim 3, wherein the replace way selection unit selects, when the ways other than the way of the move-in request, issued for the memory access request having the same index, that has been registered in the plurality of entries of the move-in buffer are valid in the cache memory, the replace way, based on how old access to the ways other than the way of the move-in request, issued for the memory access request having the same index, that has been registered in the plurality of entries of the move-in buffer is.

5. The arithmetic processing device according to claim 1, wherein the match counter includes a shared match counter shared among move-in requests of a plurality of different types of the same index, and the move-in buffer control unit increments the shared match counter when acquiring the entry of the plurality of entries of the move-in buffer for the memory access request having any of the plurality of different types of the same index and decrements the shared match counter when opening the acquired entry of the move-in buffer.

6. The arithmetic processing device according to claim 1, wherein the match counter includes an exclusive match counter exclusively used for the move-in request of a single type of the same index, and the move-in buffer control unit increments the exclusive match counter when acquiring the entry of the plurality of entries of the move-in buffer for the memory access request having the single type of the same index and decrements the exclusive match counter when opening the acquired entry of the move-in buffer.

7. The arithmetic processing device according to claim 6, wherein the move-in buffer control unit does not acquire the entry of the plurality of entries of the move-in buffer and does not issue the move-in request for the memory access request having the same index other than the single type of the same index regardless of a value of the exclusive match counter.

8. The arithmetic processing device according to claim 1, wherein the match counter includes a plurality of exclusive match counters exclusively used for respective move-in requests of a plurality of different types of the same index, and the move-in buffer control unit increments the exclusive match counters corresponding to the plurality of different types of the same index when acquiring the entry of the plurality of entries of the move-in buffer for the memory access requests having the same index and decrements the exclusive match counters when opening the acquired entry of the move-in buffer.

9. The arithmetic processing device according to claim 1, wherein each of the plurality of entries of the move-in buffer stores a valid bit indicating whether the move-in request has been registered in the entry of the move-in buffer, and an index, a replace way and data of the move-in request that has been registered, each of the plurality of entries further storing a same index flag indicating that the move-in request registered in the entry of the move-in buffer is the move-in request issued for the memory access request having the same index, and the move-in buffer control unit registers the same index flag when acquiring the entry of the plurality of entries of the move-in buffer for the memory access request having the same index, and decrements the match counter when opening the acquired entry of the move-in buffer and the same index flag is stored in the acquired entry of the move-in buffer.

10. The arithmetic processing device according to claim 1, wherein the memory access request issuance unit is a command issuance unit, the cache is a first-level cache, and the move-in buffer control unit issues the move-in request to a second cache closer to a main memory than the first-level cache.

11. The arithmetic processing device according to claim 1, wherein the memory access request issuance unit is a first-level cache, and the cache is a second-level cache closer to a main memory than the first-level cache.

12. The arithmetic processing device according to claim 11, wherein the move-in buffer control unit issues the move-in request to a third-level cache closer to the main memory than the second-level cache.

13. The arithmetic processing device according to claim 11, wherein the move-in buffer control unit issues the move-in request to a memory control unit configured to control access to the main memory.

14. An information processing device comprising:
an arithmetic processing device; and
a main memory being accessed by the arithmetic processing device;
the arithmetic processing device including,
a memory access request issuance unit configured to issue a memory access request; and
a cache including
a cache memory that has a tag memory and a data memory,
a move-in buffer control unit that is configured to issue a move-in request for requesting data of the memory access request when a cache miss occurs based on the memory access request,
a move-in buffer having a plurality of entries for registering the move-in request, a match counter, and a replace way selection unit configured to select a replace way of the cache memory, in which response data of the move-in request issued for the memory access request is registered, from among ways other than a way of the move-in request, having an index same as the memory access request for which the move-in request is issued, that has been registered in the plurality of entries of the move-in buffer;

the move-in buffer control unit, when the cache miss occurs based on the memory access request, acquires an entry of the plurality of entries of the move-in buffer, issues the move-in request and increments the match counter when the memory access request has a same index as an index of any move-in request that has been registered in the plurality of entries of the move-in buffer and a value of the match counter is less than a number of ways of the cache memory, does not acquire an entry of the plurality of entries of the move-in buffer and does not issue the move-in request when the memory access request has the same index and the value of the match counter reaches the number of the ways, decrements the match counter when opening the acquired entry of the move-in buffer after a data response for the move-in request issued for the memory access request having the same index, and the move-in buffer control unit acquires the entry of the plurality of entries of the move-in buffer, before the replace way selection unit selects the replace way of the cache memory.

15. A method of controlling an arithmetic processing device, the method comprising:

an move-in buffer control unit of the arithmetic processing device, which includes a memory access request issuance unit configured to issue a memory access request, a cache including a cache memory that has a tag memory and a data memory, the move-in buffer control unit that is configured to issue a move-in request for requesting data of the memory access request when a cache miss occurs based on the memory access request, a move-in buffer having a plurality of entries for registering the move-in request, a match counter, and a replace way selection unit configured to select a replace way of the cache memory, in which response data of the move-in request issued for the memory access request is registered, from among ways other than a way of the move-in request, having an index same as the memory access request for which the move-in request is issued, that has been registered in the plurality of entries of the move-in buffer, when the cache miss occurs based on the memory access request, acquiring an entry of the plurality of entries of the move-in buffer before the replace way selection unit selects the replace way of the cache memory, issuing the move-in request and incrementing the match counter when the memory access request has a same index as an index of any move-in request that has been registered in the plurality of entries of the move-in buffer and a value of the match counter is less than a number of ways of the cache memory, not acquiring an entry of the plurality of entries of the move-in buffer and not issuing the move-in request when the memory access request has the same index and the value of the match counter reaches the number of the ways, and decrementing the match counter when opening the acquired entry of the move-in buffer after a data response for the move-in request issued for the memory access request having the same index.

* * * * *